United States Patent
Yu et al.

(10) Patent No.: US 10,840,835 B2
(45) Date of Patent: Nov. 17, 2020

(54) CAMERA MODULE

(71) Applicant: Samsung Electro-Mechanics Co., Ltd., Suwon-si (KR)

(72) Inventors: Je Hyeon Yu, Suwon-si (KR); Youn Joong Lee, Suwon-si (KR); Sung Man Pang, Suwon-si (KR); Jin Kim, Suwon-si (KR); Koon Shik Cho, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 44 days.

(21) Appl. No.: 16/247,855

(22) Filed: Jan. 15, 2019

(65) Prior Publication Data
US 2020/0052621 A1 Feb. 13, 2020

(30) Foreign Application Priority Data
Aug. 13, 2018 (KR) .......................... 10-2018-0094278

(51) Int. Cl.
| | | |
|---|---|---|
| H02P 6/185 | (2016.01) | |
| G01D 5/20 | (2006.01) | |
| G03B 13/36 | (2006.01) | |
| H04N 5/225 | (2006.01) | |

(52) U.S. Cl.
CPC .............. *H02P 6/185* (2013.01); *G03B 13/36* (2013.01); *H04N 5/2253* (2013.01); *G01D 5/2066* (2013.01); *G03B 2205/0069* (2013.01)

(58) Field of Classification Search
CPC . H02P 6/185; G03B 13/36; G03B 2205/0069; H04N 5/2253; G01D 5/2066
USPC ........................................................ 324/207.16
See application file for complete search history.

(56) References Cited

U.S. PATENT DOCUMENTS

| | | | |
|---|---|---|---|
| 9,001,224 B2* | 4/2015 | Moriya ............... | H04N 5/2253 348/208.99 |
| 9,661,198 B2 | 5/2017 | Macours et al. | |
| 2007/0133092 A1* | 6/2007 | Maeda ................. | G02B 27/646 359/557 |
| 2016/0299349 A1* | 10/2016 | Cho ........................ | G02B 7/08 |
| 2018/0356609 A1* | 12/2018 | Kim .................... | H02K 41/0356 |

FOREIGN PATENT DOCUMENTS

| | | |
|---|---|---|
| JP | 4390347 B2 | 12/2009 |
| KR | 10-2013-0077216 A | 7/2013 |
| KR | 10-2017-0109193 A | 9/2017 |

* cited by examiner

*Primary Examiner* — Reena Aurora
(74) *Attorney, Agent, or Firm* — NSIP Law

(57) ABSTRACT

A camera module includes a lens barrel configured to be movable; a detection target disposed on one side of the lens barrel; an integrated coil and a sensing coil facing the detection target and disposed in a direction perpendicular to a direction of movement of the lens barrel; a driver configured to apply a driving signal to the integrated coil; and a position detector configured to detect a position of the lens barrel according to an inductance of the integrated coil and an inductance of the sensing coil, wherein a width of the integrated coil in the direction perpendicular to the direction of movement of the lens barrel and a width of the sensing coil in the direction perpendicular to the direction of movement of the lens barrel change in the direction of movement of the lens barrel.

26 Claims, 15 Drawing Sheets

CAMERA MODULE

CROSS-REFERENCE TO RELATED APPLICATIONS

This application claims benefit under 35 USC 119(a) of Korean Patent Application No. 10-2018-0094278 filed on Aug. 13, 2018, in the Korean Intellectual Property Office, the entire disclosure of which is incorporated herein by reference for all purposes.

BACKGROUND

1. Field

This application relates to a camera module.

2. Description of Related Art

For some time, a portable communications terminal such as a cellular phone, a personal digital assistant (PDA), or a portable personal computer (PC), has generally been implemented with the capability to transmit video data, as well as text or audio data. In accordance with this trend, a camera module has become a standard feature in portable communications terminals to enable the transmission of the video data, video chatting, and other functions involving the transmission of video data.

Generally, a camera module includes a lens barrel having lenses disposed therein, a housing accommodating the lens barrel therein, and an image sensor converting an image of a subject into an electrical signal. A fixed-focus type camera module capturing an image of an object using a fixed focus may be used as the camera module. However, as camera module technology has developed, a camera module including an actuator enabling autofocusing (AF) has recently been used. In addition, the camera module may include an actuator for optical image stabilization (OIS) to suppress a decrease in resolution due to a hand-shake of a user at the time of capturing an image or a moving picture.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a camera module includes a lens barrel configured to be movable; a detection target disposed on one side of the lens barrel; an integrated coil and a sensing coil facing the detection target and disposed in a direction perpendicular to a direction of movement of the lens barrel; a driver configured to apply a driving signal to the integrated coil; and a position detector configured to detect a position of the lens barrel according to an inductance of the integrated coil and an inductance of the sensing coil, wherein a width of the integrated coil in the direction perpendicular to the direction of movement of the lens barrel and a width of the sensing coil in the direction perpendicular to the direction of movement of the lens barrel change in the direction of movement of the lens barrel.

The width of the integrated coil in the direction perpendicular to the direction of movement of the lens barrel and the width of the sensing coil in the direction perpendicular to the direction of movement of the lens barrel may increase or decrease in opposite directions in the direction of movement of the lens barrel.

The width of the integrated coil in the direction perpendicular to the direction of movement of the lens barrel may be greater than the width of the sensing coil in the direction perpendicular to the direction of movement of the lens barrel.

The position detector may be further configured to compare the inductance of the integrated coil and the inductance of the sensing coil with each other, and detect the position of the lens barrel based on a result of the comparing of the inductances with each other.

The position detector may be further configured to compare directions in which the inductance of the integrated coil and the inductance of the sensing coil increase or decrease with each other, and detect the position of the lens barrel based on a result of the comparing of the directions with each other.

The position detector may be further configured to detect the position of the lens barrel based on a difference between the inductance of the integrated coil and the inductance of the sensing coil in response to the result of the comparing of the directions with each other indicating that the inductance of the integrated coil and the inductance of the sensing coil increase or decrease in opposite directions.

The position detector may be further configured not to detect the position of the lens barrel in response to the result of the comparing of the directions with each other indicating that the inductance of the integrated coil and the inductance of the sensing coil increase or decrease in a same direction.

The position detector may be further configured to generate a first oscillation signal according to the inductance of the integrated coil and a second oscillation signal according to the inductance of the sensing coil, and detect the position of the lens barrel according to a frequency of the first oscillation signal and a frequency of the second oscillation signal.

In another general aspect, a camera module includes a lens barrel configured to be movable; a detection target configured to be movable with the lens barrel; an integrated coil facing the detection target; a reference coil facing the detection target; a shielding layer disposed between the reference coil and the detection target; a driver configured to apply a driving signal to the integrated coil; and a position detector configured to detect a position of the lens barrel according to an inductance of the integrated coil and an inductance of the reference coil.

The integrated coil may be disposed on a first surface of the shielding layer, and the reference coil may be disposed on a second surface of the shielding layer.

The integrated coil may include a plurality of layers, the shielding layer may be disposed facing the detection target in a hollow portion of at least one layer of the plurality of layers, and the reference coil may be disposed in a hollow portion of at least one other layer of the plurality of layers.

The inductance of the integrated coil may change according to a movement of the lens barrel, and the inductance of the reference coil may remain substantially constant as the lens barrel moves.

The inductance of the integrated coil and the inductance of the reference coil may change according to a common noise component.

The position detector may be further configured to remove the common noise component by detecting the position of the detection target based on a difference between the inductance of the integrated coil and the inductance of the reference coil.

The position detector may be further configured to detect the position of the detection target based on a difference between the inductance of the integrated coil and the inductance of the reference coil.

The inductance of the integrated coil may be greater than the inductance of the reference coil.

In another general aspect, a camera module includes a lens barrel configured to be movable; a detection target disposed on the lens barrel; an integrated coil and a sensing coil disposed facing the detection target in a direction perpendicular to a direction of an optical axis of the lens barrel; a driver configured to apply a driving signal to the integrated coil to drive the lens barrel in the optical axis direction; and a position detector configured to detect a position of the lens barrel in the optical axis direction according to an inductance of the integrated coil and an inductance of the sensing coil, wherein a geometry of the integrated coil causes the inductance of the integrated coil to change in a first direction as the lens barrel moves in the optical axis direction, and a geometry of the sensing coil causes the inductance of the sensing coil to change in a second direction opposite to the first direction as the lens barrel moves in the optical axis direction.

The geometry of the integrated coil and the geometry of the sensing coil may cause the inductance of the integrated coil to increase and the inductance of the sensing coil to decrease as the lens barrel moves in a first direction in the optical axis direction, and may cause the inductance of the integrated coil to decrease and the inductance of the sensing coil to increase as the lens barrel moves in a second direction in the optical axis direction opposite to the first direction.

The position detector may be further configured to detect the position of the lens barrel in the optical axis direction based on a difference between the inductance of the integrated coil and the inductance of the sensing coil.

A common noise component may cause the inductance of the integrated coil and the inductance of the sensing coil to change in a same direction, and the position detector may be further configured to remove the common noise component by detecting the position of the lens barrel in the optical axis direction based on a difference between the inductance of the integrated coil and the inductance of the sensing coil.

In another general aspect, a camera module includes a lens barrel configured to be movable; a detection target disposed on the lens barrel; an integrated coil and a reference coil disposed facing the detection target in a direction perpendicular to a direction of an optical axis of the lens barrel; a driver configured to apply a driving signal to the integrated coil to drive the lens barrel in the direction perpendicular to the optical axis direction; and a position detector configured to detect a position of the lens barrel in the direction perpendicular to the optical axis direction according to an inductance of the integrated coil and an inductance of the reference coil, wherein the inductance of the integrated coil changes as the lens barrel moves in the direction perpendicular to the optical axis direction, and the inductance of the reference coil remains substantially constant as the lens barrel moves in the direction perpendicular to the optical axis direction.

The camera module may further include a shielding layer disposed between the reference coil and the detection target so that the reference coil faces the detection target through the shielding layer, and the shielding layer may prevent the inductance of the reference coil from substantially changing as the lens barrel moves in the direction perpendicular to the optical axis direction.

The position detector may be further configured to detect the position of the lens barrel in the direction perpendicular to the optical axis direction based on a difference between inductance of the integrated coil and the inductance of the reference coil.

A common noise component may cause the inductance of the integrated coil and the inductance of the reference coil to change in a same direction, and the position detector may be further configured to remove the common noise component by detecting the position of the lens barrel in the direction perpendicular to the optical axis direction based on a difference between the inductance of the integrated coil and the inductance of the reference coil.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
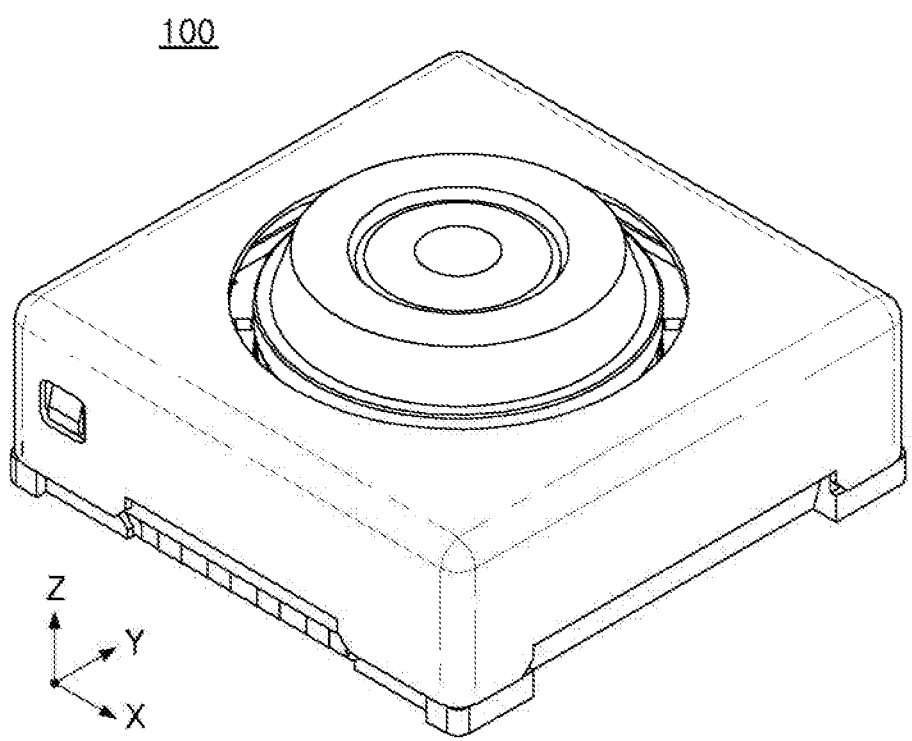
FIG. 1 is a perspective view of an example of a camera module.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Figure 2:
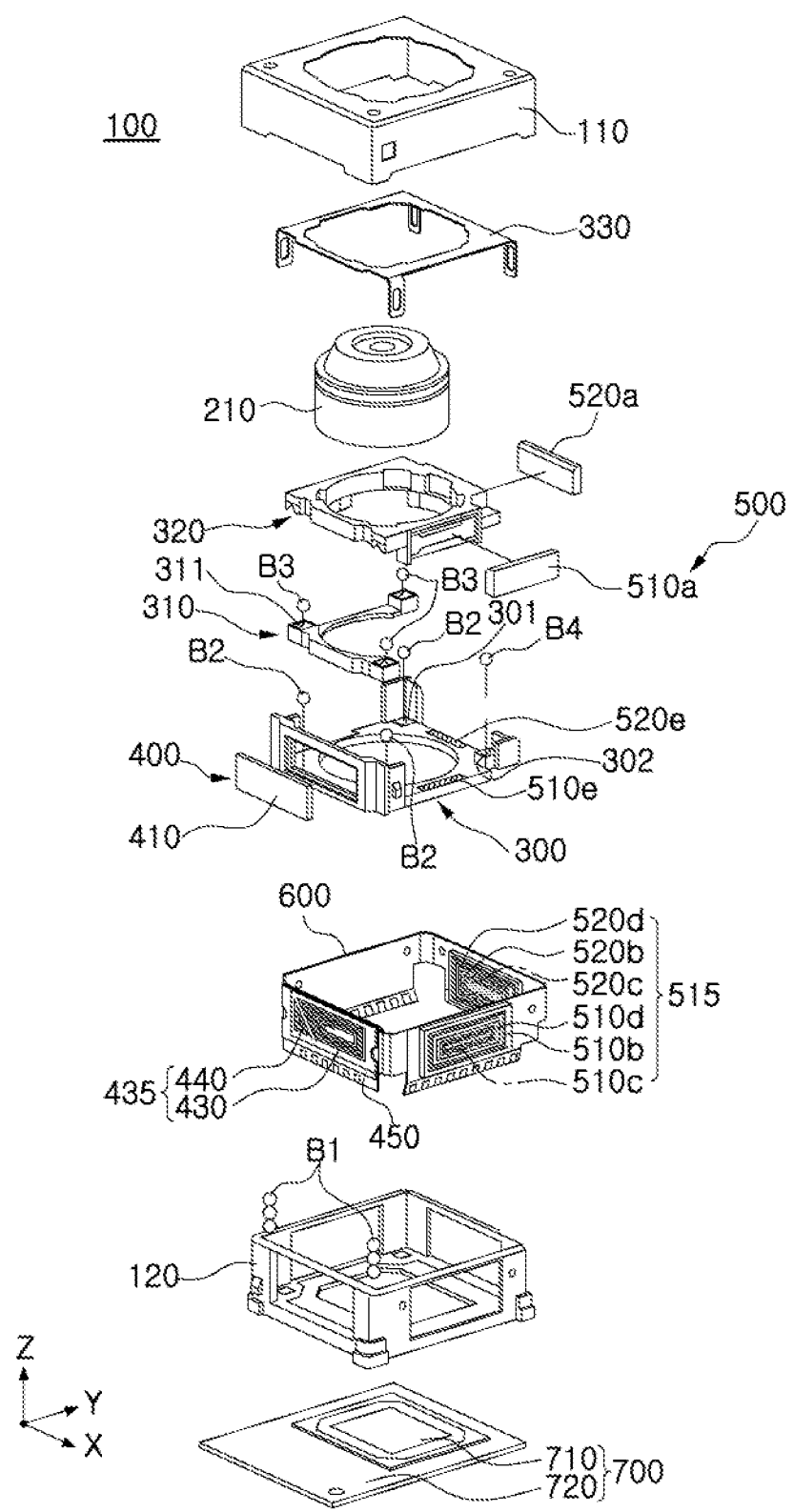
FIG. 2 is a schematic exploded perspective view of the camera module of FIG. 1.

FIG. 1 is a perspective view of an example of a camera module, and FIG. 2 is a schematic exploded perspective view of the camera module of FIG. 1.

Referring to FIGS. 1 and 2, a camera module 100 includes a lens barrel 210 and an actuator to be described below moving the lens barrel 210. In addition, the camera module 100 includes a case 110 and a housing 120 that accommodate the lens barrel 210 and the actuator, and further includes an image sensor module 700 that converts light incident through the lens barrel 210 into an electrical signal.

The lens barrel 210 has a hollow cylindrical shape to accommodate a plurality of lenses capturing an image of a subject, and the plurality of lenses are mounted in the lens barrel 210 along an optical axis. The number of lenses disposed in the lens barrel 210 depends on a design of the lens barrel 210, and the lenses may have respective optical characteristics such as the same refractive index, different refractive indices, and other optical characteristics.

The actuator moves the lens barrel 210. As an example, the actuator moves the lens barrel 210 in an optical axis (Z axis) direction to focus the lenses, and moves the lens barrel 210 in a direction perpendicular to the optical axis (the Z axis) to correct a shake at the time of capturing an image. The actuator includes a focusing unit 400 that focuses the lenses and a shake correction unit 500 that corrects the shake.

The image sensor module 700 converts light incident thereto through the lens barrel 210 into an electrical signal. As an example, the image sensor module 700 includes an image sensor 710 and a printed circuit board 720 on which the image sensor 710 is mounted, and further includes an infrared filter (not illustrated in FIG. 2). The infrared filter cuts off light in an infrared region in the light incident thereto through the lens barrel 210. The image sensor 710 converts the light incident thereto through the lens barrel 210 into an electrical signal. As an example, the image sensor 710 may be a charge-coupled device (CCD) image sensor or a complementary metal-oxide-semiconductor (CMOS) image sensor. The electrical signal converted by the image sensor 710 may be output as an image through a display unit of a portable electronic device. The image sensor 710 is mounted on the printed circuit board 720, and is electrically connected to the printed circuit board 720 by wire bonding, for example.

The lens barrel 210 and the actuator are accommodated in the housing 120. As an example, the housing 120 has a shape in which the top and the bottom are open, and the lens barrel 210 and the actuator are accommodated in an internal space of the housing 120. The image sensor module 700 is disposed on the bottom of the housing 120.

The case 110 is coupled to the housing 120 to surround outer surfaces of the housing 120, and protect internal components of the camera module 100. In addition, the case 110 shields electromagnetic waves. As an example, the case 110 shields electromagnetic waves generated by the camera module 100 so that the electromagnetic waves do not influence other electronic components in the portable electronic device.

As described above, the actuator includes the focusing unit 400 that focuses the lenses and the shake correction unit 500 that corrects the shake.

The focusing unit 400 includes a magnet 410 and an integrated coil 430 generating a driving force to move the lens barrel 210 and a carrier 300 accommodating the lens barrel 210 therein in the optical axis (Z axis) direction. As will be described later, a driving signal is provided to the integrated coil 430 so that the integrated coil 430 operates as a driving coil. In addition, as will be described later, since a position of the lens barrel 210 is detected according to an inductance of the integrated coil 430 that changes with the movement of the lens barrel 210, the integrated coil 430 also operates as a sensing coil. That is, in this example, the integrated coil 430 is a coil that operates as both the driving coil and the sensing coil.

The magnet 410 is mounted on the carrier 300. As an example, the magnet 410 is mounted on one surface of the carrier 300. The integrated coil 430 is mounted on the housing 120, and is disposed to face the magnet 410. As an example, the integrated coil 430 is disposed on a surface of a substrate 600 facing the magnet 410, and the substrate 600 is mounted on the housing 120.

As an example, the magnet 410 is mounted on the carrier 300 to move in the optical axis (Z axis) direction together with the carrier 300, and the integrated coil 430 is fixed to the housing 120. However, in another example, positions of the magnet 410 and the integrated coil 430 are exchanged with each other. When the driving signal is applied to the integrated coil 430, the carrier 300 is moved in the optical axis (Z axis) direction by an electromagnetic interaction between the magnet 410 and the integrated coil 430.

Since the lens barrel 210 is accommodated in the carrier 300, the lens barrel 210 is also moved in the optical axis (Z axis) direction by the movement of the carrier 300. In addition, since a frame 310 and a lens holder 320 are accommodated in the carrier 300, the frame 310, the lens holder 320, and the lens barrel 210 are moved together in the optical axis (Z axis) direction by the movement of the carrier 300.

Rolling members B1 are disposed between the carrier 300 and the housing 120 to reduce friction between the carrier 300 and the housing 120 when the carrier 300 is moved. As an example, the rolling members B1 have a ball form. The rolling members B1 are disposed at opposite ends of the magnet 410.

A yoke 450 is disposed on the housing 120. As an example, the yoke 450 is mounted on a surface of the substrate 600 facing away from the magnet 410, and the substrate 600 is disposed on the housing 120. Thus, the yoke 450 is mounted on an opposite surface of the substrate 600 from the integrated coil 430. Therefore, the yoke 450 is disposed to face the magnet 410 with the substrate 600 and the integrated coil 430 interposed therebetween. An attractive force acts in a direction perpendicular to the optical axis (Z axis) between the yoke 450 and the magnet 410. Therefore, the rolling members B1 are maintained in a state in which they are in contact with the carrier 300 and the housing 120 by the attractive force between the yoke 450 and the magnet 410. In addition, the yoke 450 collects a magnetic field of the magnet 410 to prevent generation of a leakage magnetic field. As an example, the yoke 450 and the magnet 410 form a magnetic circuit.

In the examples described in this application, in a focusing process, a closed-loop control method of sensing and feeding back a position of the lens barrel 210 is used. Therefore, a position detector to be described later is provided to perform a closed-loop control. The position detector detects the position of the lens barrel 210 based on the inductance of the integrated coil 430. In the example illustrated in FIG. 2, the focusing unit 400 additionally includes a sensing coil 440 provided on one side of the integrated coil 430. The integrated coil 430 and the sensing coil 440 form an autofocusing (AF) coil unit 435. The position detector detects the position of the lens barrel in the Z axis direction according to the inductance of the integrated coil 430 and the inductance of the sensing coil 440.

Figure 3A:
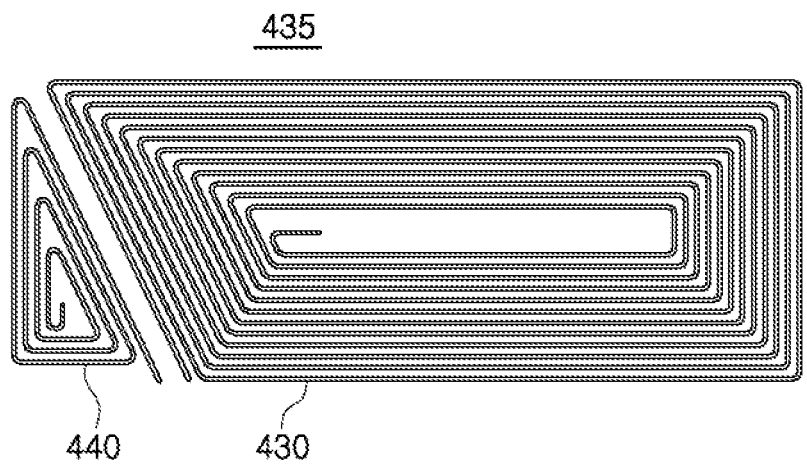
FIGS. 3A through 3C are views illustrating examples of an autofocusing (AF) coil unit.
Figure 3B:
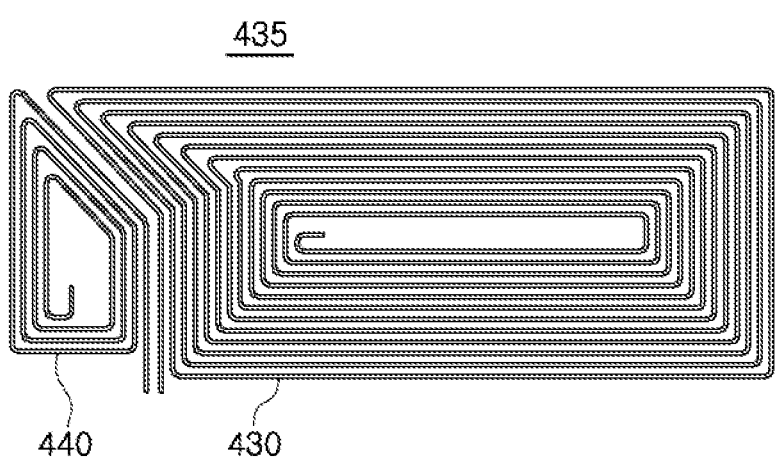
Figure 3C:
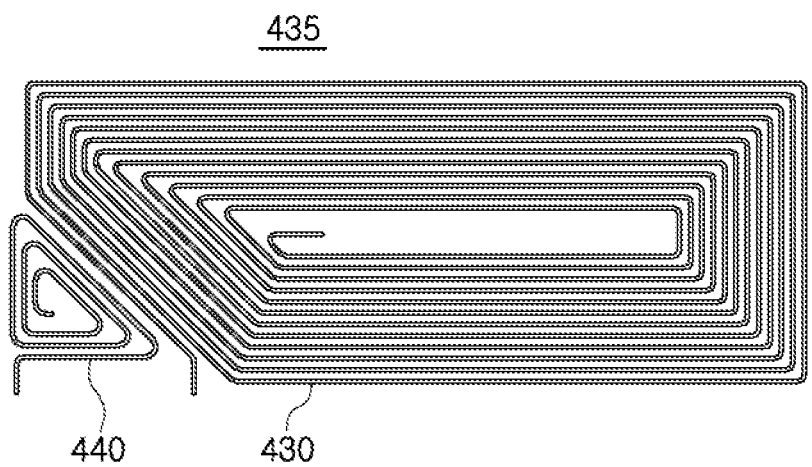

FIGS. 3A through 3C are views illustrating examples of an autofocusing (AF) coil unit.

Referring to FIGS. 3A through 3C, the integrated coil 430 and the sensing coil 440 of the AF coil unit 435 are disposed on the same plane. The integrated coil 430 and the sensing coil 440 are disposed on one surface of the substrate 600 to face the magnet 410. The integrated coil 430 and the sensing coil 440 are spaced apart from each other in a direction perpendicular to the optical axis.

A width of each of the integrated coil 430 and the sensing coil 440 in a direction perpendicular to the optical axis direction changes in the optical axis direction. As an example, the widths of the integrated coil 430 and the sensing coil 440 in the direction perpendicular to the optical axis direction increase or decrease in opposite directions in one direction of the optical axis. Referring to FIGS. 3A through 3C, the width of the integrated coil 430 in the direction perpendicular to the optical axis direction increases in one direction of the optical axis, i.e., the upward direction in FIGS. 3A through 3C, and the width of the sensing coil 440 in the direction perpendicular to the optical axis direction decreases along the one direction of the optical axis. i.e., the upward direction in FIGS. 3A through 3C. However, in another example, the of the integrated coil 430 in the direction perpendicular to the optical axis direction increases in the other direction of the optical axis, i.e., the downward direction in FIGS. 3A through 3C, and the area of the sensing coil 440 in the direction perpendicular to the optical axis direction decreases in the other direction of the optical axis, i.e., the downward direction in FIGS. 3A through 3C.

The integrated coil 430 and the sensing coil 440 are disposed in different regions of the AF coil unit 435 by dividing an area occupied by the AF coil unit 435. As an example, the integrated coil 430 occupies 75% to 90% of the area of the AF coil unit 435, and the sensing coil 440 occupies 25% to 10% of the area of the AF coil unit 435. Most of the area of the AF coil unit 435 is occupied by the integrated coil 430, so that the driving force in the optical axis direction is improved.

The AF coil unit 435 may be formed in various shapes such as a quadrangular shape, a triangular shape, and a circular shape. In the examples illustrated in FIGS. 3A through 3C, the AF coil unit 435 is formed in a quadrangular shape, the sensing coil unit 440 is formed in a triangular shape (FIGS. 3A and 3C) or a trapezoidal shape (FIG. 3B), and the integrated coil 430 is formed in a trapezoidal shape (FIG. 3A), a combination of a trapezoidal shape and a quadrangular shape (FIGS. 3B and 3C). A height of the sensing coil 440 in the optical axis direction is substantially equal to a height of the AF coil unit 435 in the optical axis direction (FIGS. 3A and 3B), or is less than the height of the AF coil unit 435 in the optical axis direction (FIG. 3C).

When the lens barrel 210 moves in the optical axis direction, the inductance of the integrated coil 430 and the inductance of the sensing coil 440 increase or decrease in opposite directions. The position detector of the focusing unit detects a position of the lens barrel 210 in the optical axis direction according to the inductances of the integrated coil 430 and the sensing coil 440 that increase or decrease in the opposite directions.

The shake correction unit 500 is used to correct image blurring or moving picture shaking due to a factor such as a hand-shake of a user at the time of capturing an image or a moving picture. For example, when the shake is generated at the time of capturing the image due to the hand-shake of the user, the shake correction unit 500 applies a relative displacement corresponding to the shake to the lens barrel 210 to compensate for the shake. As an example, the shake correction unit 500 moves the lens barrel 210 in a direction perpendicular to the optical axis (the Z axis) to correct the shake.

The shake correction unit 500 includes a plurality of magnets 510*a* and 520*a* and a plurality of integrated coils 510*b* and 520*b* generating a driving force to move a guide member in the direction perpendicular to the optical axis (the Z axis). As will be described later, a driving signal is provided to each of the integrated coils 510*b* and 520*b* so that each of the integrated coils 510*b* and 520*b* operates as a driving coil. In addition, as will described later, since a position of the lens barrel 210 is detected according to an inductance of each of the integrated coils 510*b* and 520*b* that changes with the movement of the lens barrel 210, each of the integrated coils 510*b* and 520*b* also operates as a sensing coil. That is, in this example, the integrated coils 510*b* and 520*b* are coils that operate as both the driving coil and the sensing coil.

The frame 310 and the lens holder 320 are inserted into the carrier 300, are disposed in the optical axis (the Z axis) direction, and guide the movement of the lens barrel 210. The frame 310 and the lens holder 320 have a space into which the lens barrel 210 inserted. The lens barrel 210 is inserted and fixed into the lens holder 320.

The frame 310 and the lens holder 320 are moved in the direction perpendicular to the optical axis (the Z axis) with respect to the carrier 300 by the driving force generated by the plurality of magnets 510*a* and 520*a* and the plurality of integrated coils 510*b* and 520*b*. Among the plurality of magnets 510*a* and 520*a* and the plurality of integrated coils 510*b* and 520*b*, a first magnet 510*a* and a first integrated coil 510*b* generate a driving force in a first axis (X axis) direction perpendicular to the optical axis (the Z axis), and a second magnet 520*a* and a second integrated coil 520*b* generate a driving force in a second axis (Y axis) direction perpendicular to both the optical axis (Z axis) and the first axis (X axis). A second axis (Y axis) is an axis perpendicular to both the optical axis (the Z axis) and the first axis (the X axis). The plurality of magnets 510*a* and 520*a* are disposed to be orthogonal to each other on a plane perpendicular to the optical axis (the Z axis).

The plurality of magnets 510*a* and 520*a* are mounted on the lens holder 320, and the plurality of integrated coils 510*b* and 520*b* respectively facing the plurality of magnets 510*a* and 520*a* are disposed on the substrate 600, and the substrate 600 is mounted on the housing 120.

As an example, the plurality of magnets 510*a* and 520*a* are moved in the direction perpendicular to the optical axis (the Z axis) together with the lens holder 320, and the plurality of integrated coils 510*b* and 520*b* are fixed to the housing 120. However, in another example, positions of the plurality of magnets 510*a* and 520*a* and the plurality of integrated coils 510*b* and 520*b* are exchanged with each other.

In the examples described in this application, in a shake correction process, a closed-loop control method of sensing and feeding back a position of the lens barrel 210 is used. Therefore, a position detector to be described later is provided to perform a closed-loop control. The position detector detects the position of the lens barrel 210 based on the inductances of the integrated coils 510*b* and 520*b*. In the example illustrated in FIG. 2, the shake correction unit 500 further includes reference coils 510*c* and 520*c* formed integrally with the integrated coils 510*b* and 520*b*, respectively. A first reference coil 510*c* is formed integrally with the first integrated coil 510*b*, and a second reference coil 510*c* is formed integrally with the second integrated coil 520*c*. The integrated coils 510*b* and 520*b*, the reference coils 510*c* and 520*c*, and shielding layers 510*d* and 520*d* to be described below form an OIS coil unit 515.

The position detector generates oscillation signals corresponding to inductances of the reference coils 510*c* and 520*c*, and removes a common noise component introduced into the camera module from frequencies of the generated oscillation signals. The position detector of the shake correction unit 500 removes the common noise component from the frequencies of the oscillation signals generated from the integrated coils 510*b* and 520*b* to thereby improve reliability of a position detection of the lens barrel 210.

Figure 4A:
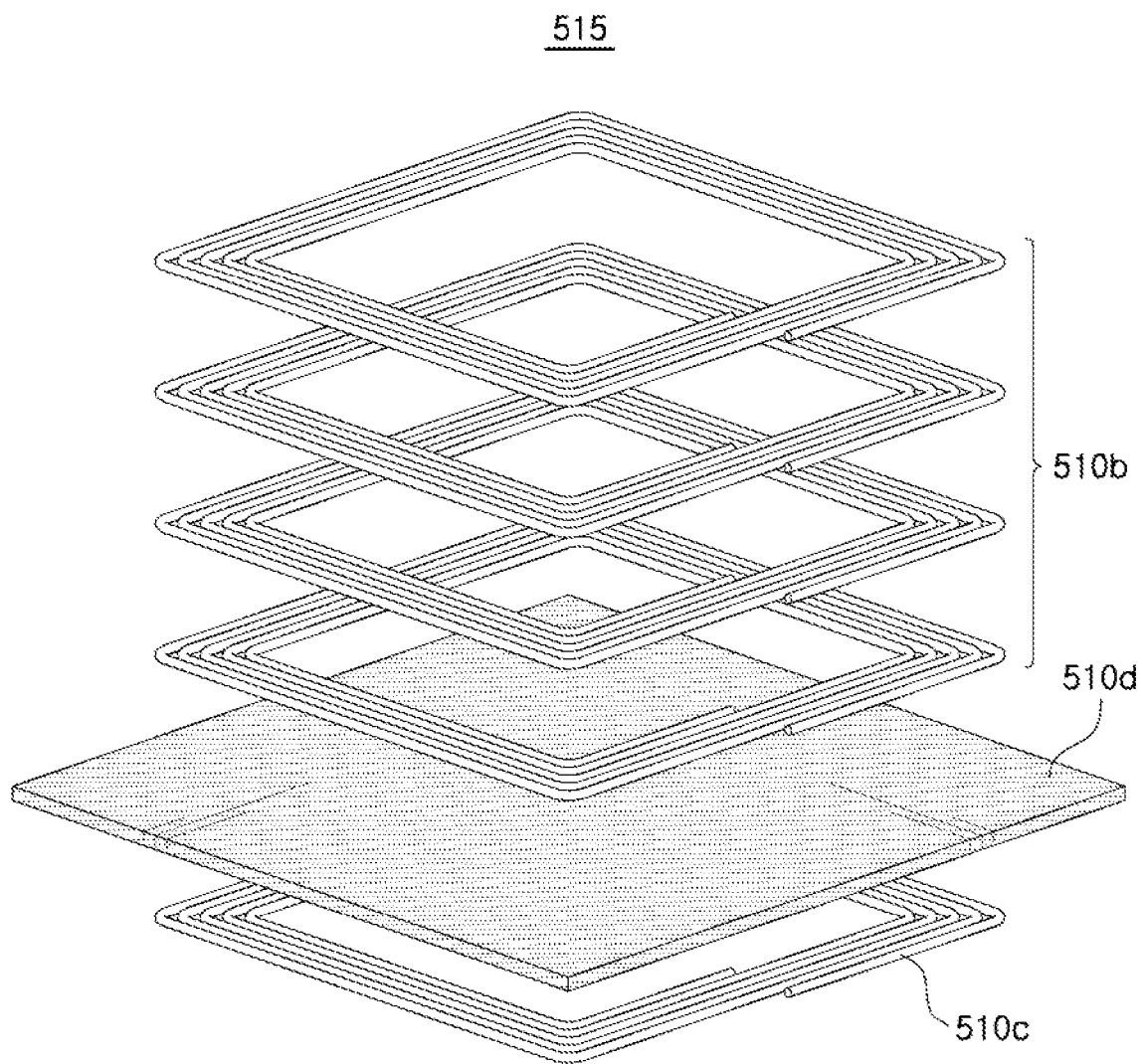
FIGS. 4A and 4B are exploded perspective views illustrating examples of an optical image stabilizer (OIS) coil unit.
Figure 4B:
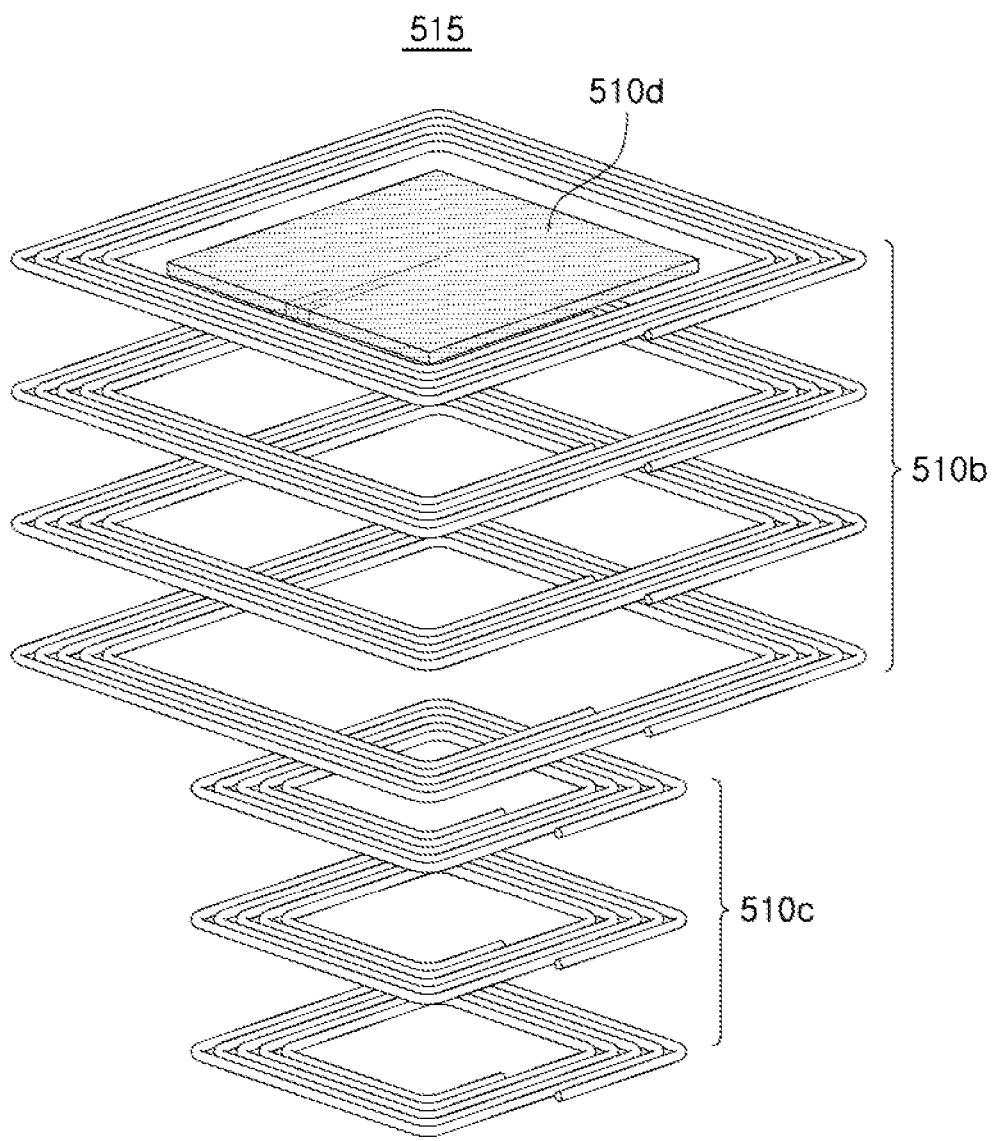

FIGS. 4A and 4B are exploded perspective views illustrating examples of an optical image stabilizer (OIS) coil unit.

Referring to FIGS. 4A and 4B, the OIS coil unit 515 includes the integrated coil 510*b*, the reference coil 510*c*, and a shielding layer 510*d*. For convenience of explanation, the following description will refer to the integrated coil 510*b*, the reference coil 510*c*, and the shielding layer 510*d*, but the description is also applicable to the integrated coil 520*b*, the reference coil 520*c*, and a shielding layer 520*d*.

Referring to FIG. 4A, the integrated coil 510*b* is provided on one surface of the shielding layer 510*d*, and the reference coil 510*c* is provided on the other surface of the shielding layer 510*d*. The integrated coil 510*b* is disposed to face the magnet 510*a*, and the reference coil 510*c* is disposed to face the magnet 510*a* with the integrated coil 510*b* and the shielding layer 510*d* interposed therebetween. The integrated coil 510*b* is formed as a multilayer coil, and the reference coil 510*c* is formed as a single layer coil. Therefore, the inductance of the integrated coil 510*b* is greater than the inductance of the reference coil 510*c*.

Referring to FIG. 4B, the integrated coil 510*b* is formed as a multilayer coil. The shielding layer 510*d* is disposed in a hollow portion (an inner side region) of a first layer of the integrated coil 510*b* formed as a multilayer coil. The reference coil 510*c* is also formed as a multilayer coil. The reference coil 510*c* is disposed in hollow portions of second to fourth layers of the integrated coil 510*b*. Therefore, the inductance of the integrated coil 510*b* is greater than the inductance of the reference coil 510*c*. The integrated coil 510*b* is disposed to face the magnet 510*a*, while the reference coil 510*c* is disposed to face the magnet 510*a* with the shielding layer 510*d* interposed therebetween.

Referring to FIGS. 4A and 4B, the reference coil 510*c* is disposed to face the magnet 510*a* with the shielding layer 510*d* interposed therebetween, so that the inductance of the reference coil 510*c* does not change even when the magnet 510*a* moves. Therefore, the common noise component can be removed by calculating a difference between an oscillation signal generated according to the inductance of the integrated coil 510*b* and an oscillation signal generated according to the inductance of the reference coil 510*c*.

Referring again to FIG. 2, the camera module 100 includes a plurality of ball members supporting the shake correction unit 500. The plurality of ball members guide movements of the frame 310, the lens holder 320, and the lens barrel 210 in the shake correction process. In addition, the plurality of ball members also maintain spacings between the carrier 300, the frame 310, and the lens holder 320.

The plurality of ball members include first ball members B2 and second ball members B3. The first ball members B2 guide movements of the frame 310, the lens holder 320, and the lens barrel 210 in the first axis (X axis) direction, and the second ball members B3 guide movements of the lens holder 320 and the lens barrel 210 in the second axis (Y axis) direction.

As an example, the first ball members B2 move in a rolling motion in the first axis (X axis) direction when a driving force in the first axis (X axis) direction is generated. Therefore, the first ball members B2 guide the movements of the frame 310, the lens holder 320, and the lens barrel 210 in the first axis (X axis) direction. In addition, the second ball members B3 move in a rolling motion in the second axis (Y axis) direction when a driving force in the second axis (Y axis) direction is generated. Therefore, the second ball members B3 guide the movements of the lens holder 320 and the lens barrel 210 in the second axis (Y axis) direction.

The first ball members B2 include a plurality of ball members disposed between the carrier 300 and the frame 310, and the second ball members B3 include a plurality of ball members disposed between the frame 310 and the lens holder 320.

First guide groove portions 301 accommodating the first ball members B2 therein are formed in surfaces of the carrier 300 and the frame 310 facing each other in the optical axis (Z axis) direction. The first guide groove portions 301 include a plurality of guide grooves corresponding to the plurality of ball members of the first ball members B2. The first ball members B2 are accommodated in the first guide groove portions 301 and are fitted between the carrier 300 and the frame 310. In a state in which the first ball members B2 are accommodated in the first guide groove portions 301, a movement of the first ball members B2 in the optical axis (Z axis) direction and the second axis (Y axis) direction is restricted, and the first ball members B2 are able to move in only the first axis (X axis) direction. As an example, the first ball members B2 are able to move in a rolling motion in only the first axis (X axis) direction. To this end, a cross-sectional shape of each of the plurality of guide grooves of the first guide groove portions 301 in a plane perpendicular to the optical axis (Z axis) is a rectangular shape having a length in the first axis (X axis) direction.

Second guide groove portions 311 accommodating the second ball members B3 therein are formed in surfaces of the frame 310 and the lens holder 320 facing each other in the optical axis (Z axis) direction. The second guide groove portions 311 include a plurality of guide grooves corresponding to the plurality of ball members of the second ball members B3.

The second ball members B3 are accommodated in the second guide groove portions 311 and are fitted between the frame 310 and the lens holder 320. In a state in which the second ball members B3 are accommodated in the second guide groove portions 311, a movement of the second ball members B3 in the optical axis (Z axis) direction and the first axis (X axis) direction is restricted, and the second ball members B3 are able to move in only the second axis (X axis) direction. As an example, the second ball members B3 are able to move in a rolling motion in only the second axis (Y axis) direction. To this end, a cross-sectional shape of each of the plurality of guide grooves of the second guide groove portions 311 in a plane perpendicular to the optical axis (Z axis) is a rectangular shape having a length in the second axis (Y axis) direction.

Furthermore, a third ball member B4 supporting a movement of the lens holder 320 is provided between the carrier 300 and the lens holder 320. The third ball member B4 guides both movement of the lens holder 320 in the first axis (X axis) direction and movement of the lens holder 320 in the second axis (Y axis) direction.

As an example, the third ball member B4 moves in a rolling motion in the first axis (X axis) direction when a driving force in the first axis (X axis) direction is generated. Therefore, the third ball member B4 guides the movement of the lens holder 320 in the first axis (X axis) direction. In addition, the third ball member B4 moves in a rolling motion in the second axis (Y axis) direction when a driving force in the second axis (Y axis) direction is generated. Therefore, the third ball member B4 guides the movement of the lens holder 320 in the second axis (Y axis) direction. Thus, the second ball members B3 and the third ball member B4 are in contact with and support the lens holder 320.

Third guide groove portions 302 accommodating the third ball member B4 therein are formed in surfaces of the carrier 300 and the lens holder 320 facing each other in the optical axis (Z axis) direction. The third ball member B4 is accommodated in the third guide groove portions 302 and is fitted between the carrier 300 and the lens holder 320. In a state in which the third ball member B4 is accommodated in the third guide groove portions 302, a movement of the third ball member B4 in the optical axis (Z axis) direction is restricted, and the third ball member B4 is able to move in a rolling motion in both the first axis (X axis) direction and the second axis (Y axis) direction. To this end, a cross-sectional shape of each of the third guide groove portions 302 in a plane perpendicular to the optical axis (Z axis) is a circular shape. Therefore, the third guide groove portions 302 have a cross-sectional shape that is different from the cross-sectional shape of the first guide groove portions 301 and the second guide groove portions 311.

The first ball members B2 are able to move in the rolling motion in the first axis (X axis) direction, the second ball members B3 are able to move in the rolling motion in the second axis (Y axis) direction, and the third ball member B4 is able to move in the rolling motion in both the first axis (X axis) direction and the second axis (Y axis) direction. Therefore, the first to third ball members B2, B3, and B4 supporting the shake correction unit 500 have different degrees of freedom. The degree of freedom is the number of independent variables needed to represent a moving state of an object in a three-dimensional (3D) coordinate system. Generally, in the 3D coordinate system, a degree of freedom of the object is 6. A movement of the object may be described by reference to an orthogonal coordinate system having three axes and a rotary coordinate system having three rotational directions. As an example, in the 3D coordinate system, the object may be moved in a translation motion along the three axes (the X axis, the Y axis, and the Z axis), and may be moved in a rotation motion about the three axes (the X axis, the Y axis, and the Z axis).

In this application, the degree of freedom is the number of independent variables needed to represent movements of the first ball members B2, the second ball members B3, and the third ball member B4 when the shake correction unit 500 is moved by the driving force generated in the direction perpendicular to the optical axis (the Z axis) by applying electric power to the shake correction unit 500. As an example, the third ball member B4 is able to move in the rolling motion along two axes (the first axis (the X axis) and the second axis (the Y axis)), and the first ball members B2 and the second ball members B3 are able to move in the rolling motion along one axis (the first axis (the X axis) or the second axis (the Y axis)), by the driving force generated in the direction perpendicular to the optical axis (the Z axis). Therefore, a degree of freedom of the third ball member B4 is greater than a degree of freedom of the first ball members B2 and a degree of freedom of the second ball members B3.

When the driving force in the first axis (X axis) direction is generated, the frame 310, the lens holder 320, and the lens barrel 210 are moved together in the first axis (X axis) direction. The first ball members B2 and the third ball member B4 move in the rolling motion along the first axis (the X axis). In this case, the movement of the second ball members B3 is restricted in the optical axis (Z axis) direction and the second axis (Y axis) direction.

In addition, when the driving force in the second axis (Y axis) direction is generated, the lens holder 320 and the lens barrel 210 are moved in the second axis (Y axis) direction. The second ball members B3 and the third ball member B4 move in the rolling motion along the second axis (the Y axis). In this case, the movement of the first ball members B2 is restricted in the optical axis (Z axis) direction and the first axis (X axis) direction, and the movement of the third ball member B4 is restricted in the optical axis (Z axis) direction.

A plurality of yokes 510e and 520e are provided to maintain the shake correction unit 500 and the first to third ball members B2, B3, and B4 in a state in which they are in contact with each other. The plurality of yokes 510e and 520e are fixed to the carrier 300, and are disposed to face bottom surfaces of the plurality of magnets 510a and 520a in the optical axis (Z axis) direction. Therefore, an attractive force is generated in the optical axis (Z axis) direction between the plurality of yokes 510e and 520e and the plurality of magnets 510a and 520a. Since the shake correction unit 500 is pressed toward the plurality of yokes 510e and 520e by the attractive force between the plurality of yokes 510e and 520e and the plurality of magnets 510a and 520a, the frame 310 and the lens holder 320 of the shake correction unit 500 are maintained in a state in which they are in contact with the first to third ball members B2, B3, and B4. The plurality of yokes 510e and 520e may be made of a material capable of generating the attractive force between the plurality of yokes 510e and 520e and the plurality of magnets 510a and 520a. As an example, the plurality of yokes 510e and 520e may be made of a magnetic material.

As described above, the plurality of yokes 510e and 520e are provided so that the frame 310 and the lens holder 320 are maintained in the state in which they are in contact with the first to third ball members B2, B3, and B4. Furthermore, a stopper 330 is provided to prevent the first to third ball members B2, B3, and B4, the frame 310, and the lens holder 320 from being separated from the carrier 300 due to an external impact or other disturbance. The stopper 330 is coupled to the carrier 300 to cover at least a portion of an upper surface of the lens holder 320.

Figure 5:
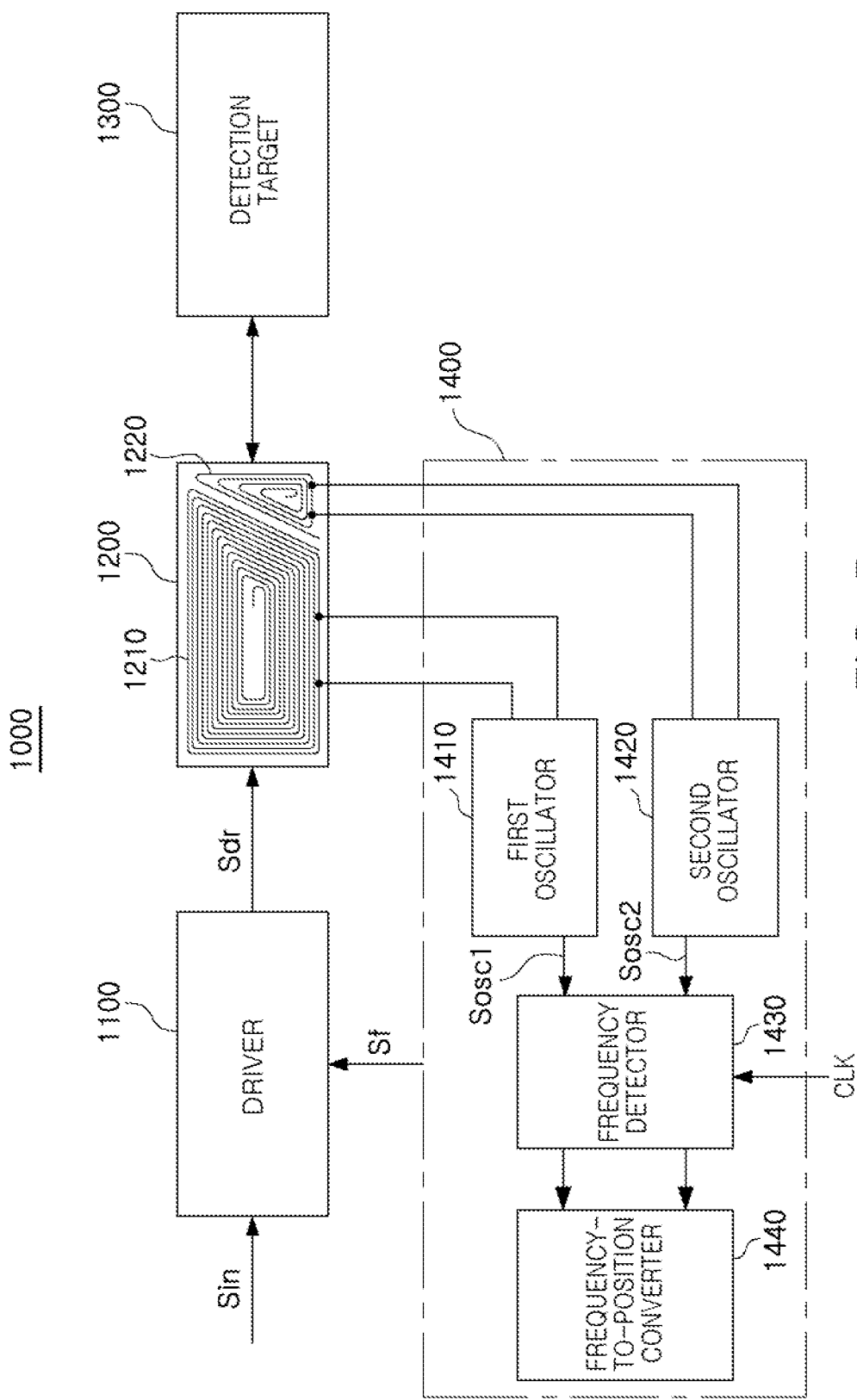
FIG. 5 is a block diagram of an example of a focusing unit.

FIG. 5 is a block diagram of an example of a focusing unit.

Referring to FIG. 5, a focusing unit 1000 operates as an actuator that drives the lens barrel in the optical axis direction. Hereinafter, the focusing unit is referred to as an actuator 1000 for convenience of explanation. The actuator 1000 drives the lens barrel in the optical axis direction to perform an autofocusing (AF) function of the camera module. Therefore, when the actuator 1000 performs the autofocusing function, a driver 1100 applies a driving signal to an integrated coil 1210 to provide a driving force in the optical axis direction to the lens barrel.

The actuator 1000 includes the driver 1100, an AF coil unit 1200 including the integrated coil 1210 and a sensing coil 1220, a detection target 1300, and a position detector 1400. The position detector 1400 includes a first oscillator 1410, a second oscillator 1420, a frequency detector 1430, and a frequency-to-position converter 1440.

The driver 1100 generates a driving signal Sdr depending on an input signal Sin applied from an external source and a feedback signal Sf generated by the position detector 1400, and provides the driving signal Sdr to the integrated coil 1210.

When the driving signal Sdr generated by the driver 1100 is applied to the integrated coil 1210, the lens barrel is moved in the optical axis by an electromagnetic interaction between the integrated coil 1210 and a magnet. As an example, the driving signal Sdr is provided to the integrated coil 1210 in the form of either one or both of a current and a voltage.

The position detector 1400 detects positions of the detection target 1300 and the lens barrel according to frequencies of an oscillation signal Sosc1 generated based on an inductance of the integrated coil 1210 and an oscillation signal Sosc2 generated based on an inductance of the sensing coil 1220. That is, since the position detector 1400 detects the position of the detection target 1300 according to the oscillation signals generated based on the inductances, the position calculation according to the inductance and the position calculation according to the oscillation signal have the same meaning.

The frequency of the oscillation signal Sosc1 generated based on the inductance of the integrated coil 1210 and the frequency of the oscillation signal Sosc2 generated based on the inductance of the sensing coil 1220 vary depending on the position of the detection target 1300.

The detection target 1300 is made of either a magnetic material or a conductor, and is within ranges of magnetic fields of the integrated coil 1210 and the sensing coil 1220. As an example, the detection target 1300 is disposed to face the integrated coil 1210 and the sensing coil 1220. The detection target 1300 is provided at one side of the lens barrel to be moved in the same direction as a moving direction of the lens barrel. In another example, the detection target 1300 is provided on either one or both of a carrier and a plurality of frames coupled to the lens barrel, in addition to the lens barrel.

In this example, the detection target 1300 corresponds to the magnet 410 of FIG. 2 disposed to face the integrated coil 1210 and the sensing coil 1220. In another example, the detection target 1300 is provided as a separate element.

In a case in which the detection target 1300 made of either the magnetic material or the conductor is moved together with the lens barrel, the inductances of the integrated coil 1210 and the sensing coil 1220 change. That is, the frequencies of the oscillation signal Sosc1 and the oscillation signal Sosc2 generated based on the inductances of the integrated coil 1210 and the sensing coil 1220 vary depending on the movement of the detection target 1300.

The position detector 1400 detects the position of the detection target 1300, generates the feedback signal Sf based on the detected position, and provides the feedback signal Sf to the driver 1100.

When the feedback signal Sf is provided to the driver 1100, the driver 1100 compares the input signal Sin and the feedback signal Sf with each other and generates a new driving signal Sdr based on a result of the comparing. That is, the driver 1100 is driven in a closed-loop type of comparing the input signal Sin and the feedback signal Sf with each other. The closed-loop type driver 1100 is driven to reduce an error between a target position of the detection target 1300 included in the input signal Sin and a present position of the detection target 1300 included in the feedback signal Sf. The closed-loop type driver 1100 has better linearity, accuracy, and repeatability compared to an open-loop type driver.

FIGS. 6 through 13 are views for describing an operation of generating an oscillation signal from an integrated coil.

Hereinafter, an operation of obtaining an oscillation signal from an integrated coil will be described in detail with reference to FIGS. 6 through 13.

Figure 6:
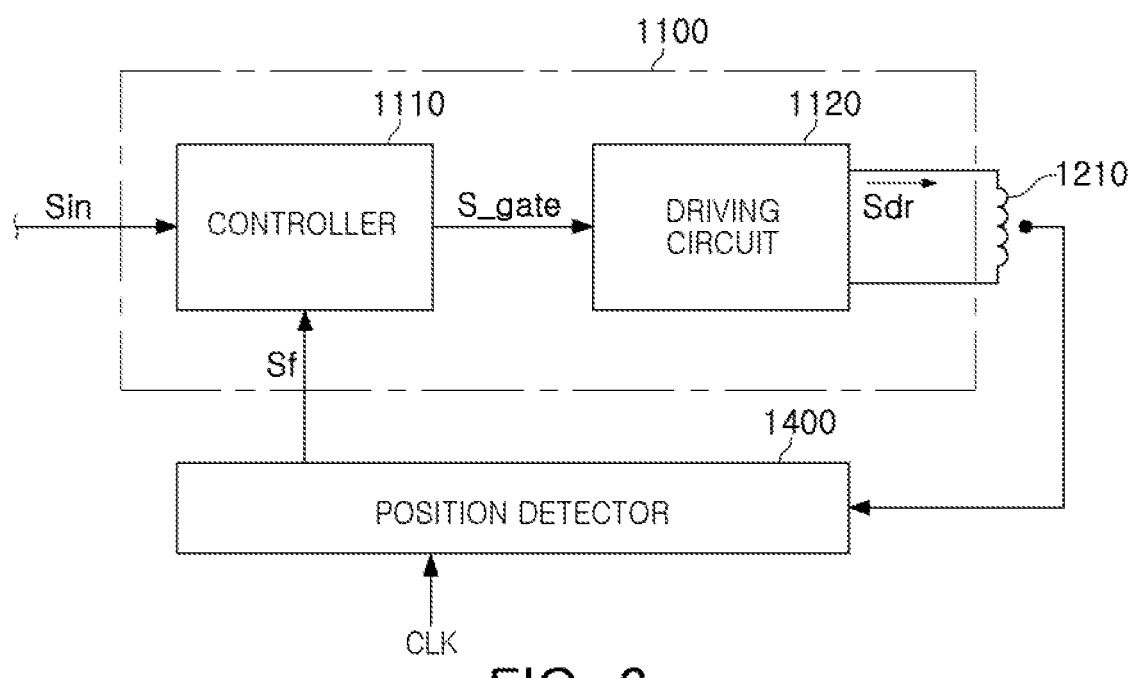
FIG. 6 is a view illustrating components of an actuator of FIG. 5.

FIG. 6 is a view illustrating main components of an actuator of FIG. 5.

Referring to FIG. 6, the driver 1100 includes a controller 1110 and a driving circuit 1120. The driver 1100 of FIG. 6 may be implemented by a driver integrated circuit (IC).

The controller 1110 generates a control signal S_gate from the input signal Sin and the feedback signal Sf provided from the position detector 1400. Specifically, the controller 1110 compares the input signal Sin specifying the target position of the lens barrel and the feedback signal Sf representing the current position of the lens barrel with each other, and generates the control signal S_gate based on a result of the comparing.

The driving circuit 1120 generates the driving signal Sdr according to the control signal S_gate and provides the driving signal Sdr to the integrated coil 1210. The driving signal Sdr is provided to both ends of the integrated coil 1210 in the form of either one or both of a current and a voltage. The lens barrel is moved to the target position by the driving signal Sdr generated by the driving circuit 1120 and provided to the integrated coil 1210.

The driving circuit 1120 includes an H-bridge circuit driven in both directions by the control signal S_gate, and applies the driving signal Sdr to the integrated coil 1210. The H-bridge circuit includes a plurality of transistors connected to both ends of the integrated coil 1210 in the form of an H bridge. When the driving circuit 1120 is driven in a voice coil motor scheme, the control signal S_gate provided from the controller 1120 is applied to a gate of the transistor included in the H-bridge circuit.

Figure 7:
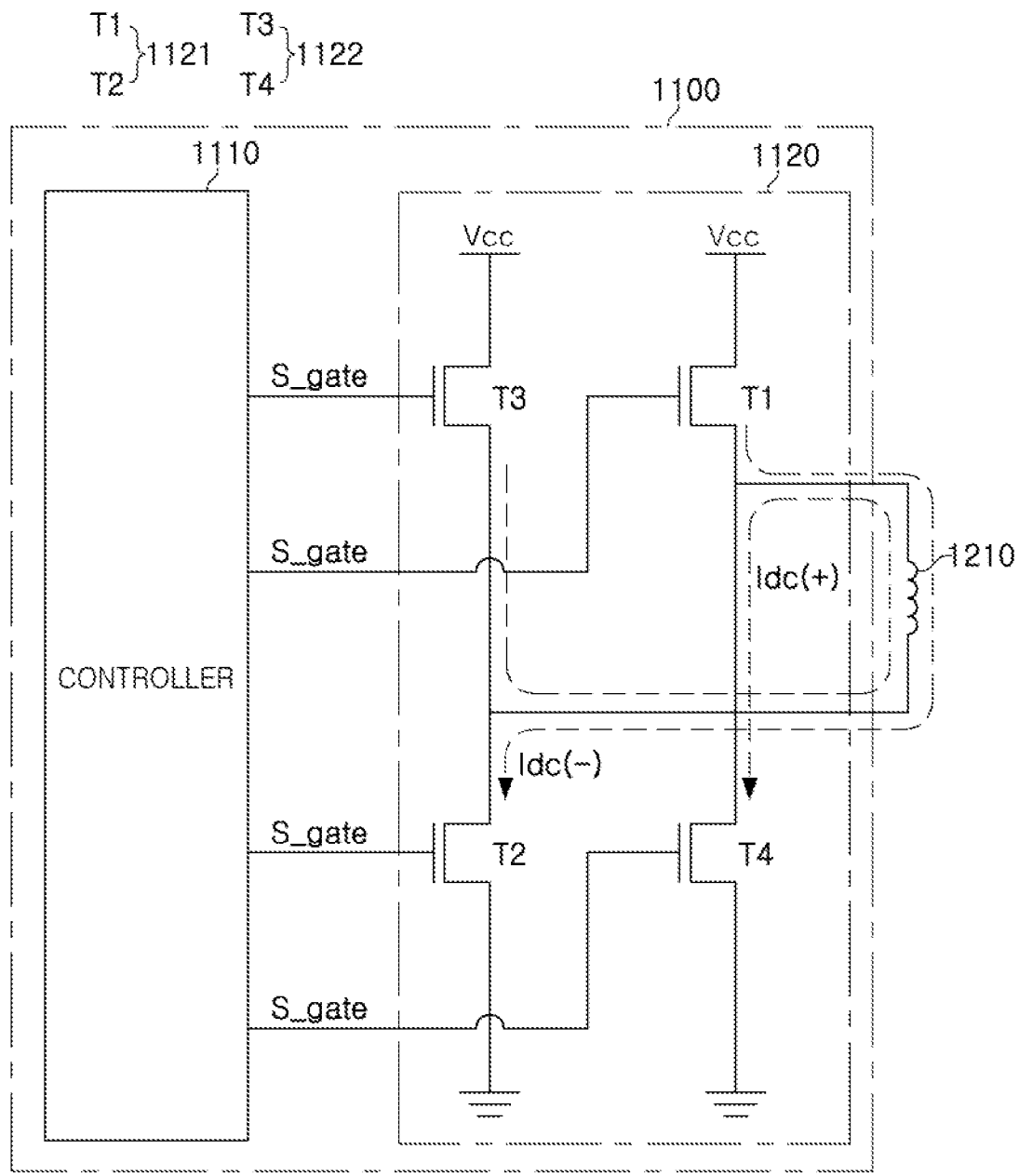
FIG. 7 is a view illustrating an example of a driving circuit of a driver of FIG. 6.

FIG. 7 is a view illustrating an example of a driving circuit of a driver of FIG. 6 in detail.

Referring to FIG. 7, the driving circuit 1120 includes a plurality of transistors T1, T2, T3, and T4 connected to the integrated coil 1210 in the form of an H bridge. Specifically, the driving circuit 1120 includes a first path transistor unit 1121 and a second path transistor unit 1122. The first path transistor unit 1121 causes a first path current Idc(−) to flow, and the second path transistor unit 1122 causes a second path current Idc(+) to flow.

The first path transistor unit 1121 includes a first transistor T1 and a second transistor T2. The first transistor T1 is connected between a driving power source Vcc and a first end of the integrated coil 1210, and the second transistor T2 is connected between a second end of the integrated coil 1210 and a ground.

The first path transistor unit 1121 forms a first path of the driving signal Sdr applied to the integrated coil 1210 according to the control signal S_gate provided from the controller 1110. As an example, the control signal S_gate is provided to gates of the first transistor T1 and the second transistor T2. As an example, when the control signal S_gate is at a high level, the first transistor T1 and the second transistor T2 are turned on, and when the control signal S_gate is at a low level, the first transistor T1 and the second transistor T2 are turned off. In another example, different control signals are provided to the first transistor T1 and the second transistor T2 so that both the first transistor T1 and the second transistor T2 are turned on or off. The first transistor T1 and the second transistor T2 may be controlled so that one of them adjusts an amount of current flowing through the first path.

The second path transistor unit 1122 includes a third transistor T3 and a fourth transistor T4. The third transistor T3 is connected between the driving power source Vcc and the second end of the integrated coil 1210, and the fourth transistor T4 is connected between the first end of the integrated coil 1210 and the ground.

The second path transistor unit 1122 forms a second path of the driving signal Sdr applied to the integrated coil 1210 according to the control signal S_gate provided from the controller 1110. As an example, the control signal S_gate is provided to gates of the third transistor T3 and the fourth transistor T4. As an example, when the control signal S_gate is at a high level, the third transistor T3 and the fourth transistor T4 are turned on, and when the control signal S_gate is at a low level, the third transistor T3 and the fourth transistor T4 are turned off. In another example, different control signals are provided to the third transistor T3 and the fourth transistor T4 so that both the third transistor T3 and the fourth transistor T4 are turned on or off. The third transistor T3 and the fourth transistor T4 may be controlled so that one of them adjusts an amount of current flowing through the second path.

The first path transistor unit 1121 and the second path transistor unit 1122 form different paths of the driving signal Sdr applied to the integrated coil 1210. As an example, an operation period of the first path transistor unit 1121 is the same as a non-operation period of the second path transistor unit 1122, and a non-operation period of the first path transistor unit 1121 is the same as an operation period of the second path transistor unit 1122.

The operation period is a period in which the transistors of the first path transistor unit 1121 or the second path transistor unit 1122 are turned on, and the non-operation period is a period in which the transistors of the first path transistor unit 1121 or the second path transistor unit 1122 are turned off.

That is, the first path transistor unit 1121 and the second path transistor unit 1122 are selectively operated by the control signal S_gate provided from the controller 1110. In the operation period of the first path transistor unit 1121, the first transistor T1 and the second transistor T2 of the first path transistor unit 1121 are turned on, and in the non-operation period of the second path transistor unit 1122, the third transistor T3 and the fourth transistor T4 of the second path transistor unit 1122 are turned off. In addition, in the non-operation period of the first path transistor unit 1121, the first transistor T1 and the second transistor T2 of the first path transistor unit 1121 are turned off, and in the operation period of the second path transistor unit 1122, the third transistor T3 and the fourth transistor T4 of the second path transistor unit 1122 are turned on.

Figure 8:
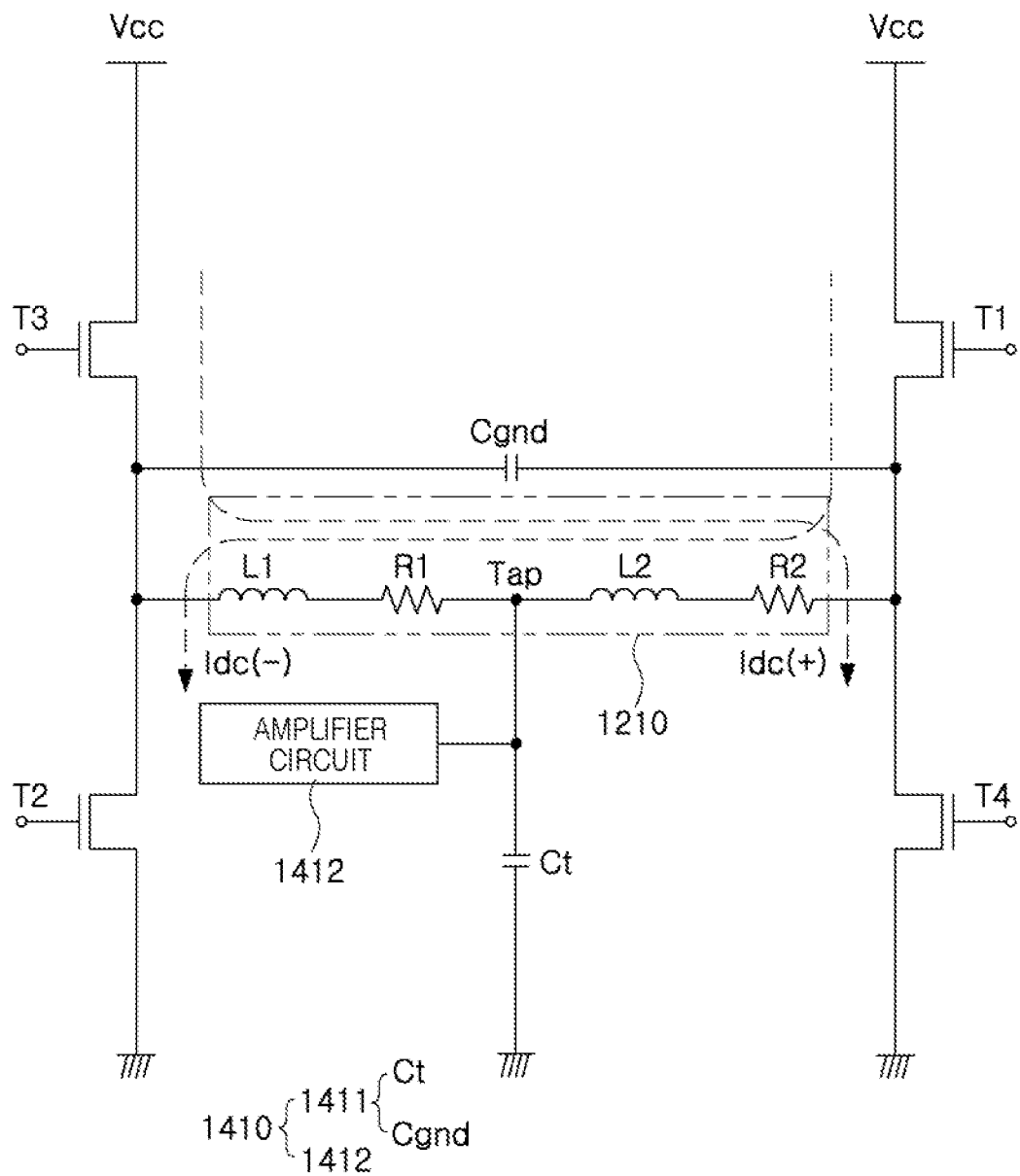
FIG. 8 is a circuit diagram of an example of a driving circuit and a first oscillator of FIG. 5.

FIG. 8 is a circuit diagram of an example of a driving circuit and a first oscillator of FIG. 5.

Referring to FIG. 8, the integrated coil 1210 is illustrated as an equivalent circuit formed by a first inductor L1, a second inductor L2, a first resistor R1, and a second resistor R2 connected in series with each other. The first resistor R1 and the second resistor R2 represent an equivalent resistance component of the integrated coil 1210 or a parasitic resistance component of a branch in which the integrated coil 1210 is disposed.

Referring to FIG. 8, the first oscillator 1410 includes oscillation circuit capacitors 1411 including a first capacitor Cgnd connected in parallel with the integrated coil 1210 and a second capacitor Ct connected between a tap terminal Tap of the integrated coil 1210 and a ground, and an amplifier circuit 1412 connected to a node between the tap terminal Tap of the integrated coil 1210 and the second capacitor Ct. The tap terminal Tap of the integrated coil 1210 is one point of a winding of the integrated coil 1210. The tap terminal Tap divides the winding of the integrated coil into a first winding section represented by the first inductor L1 and the first resistor R1, and a second winding section represented by the second inductor L2 and the second resistor R2.

Figure 9:
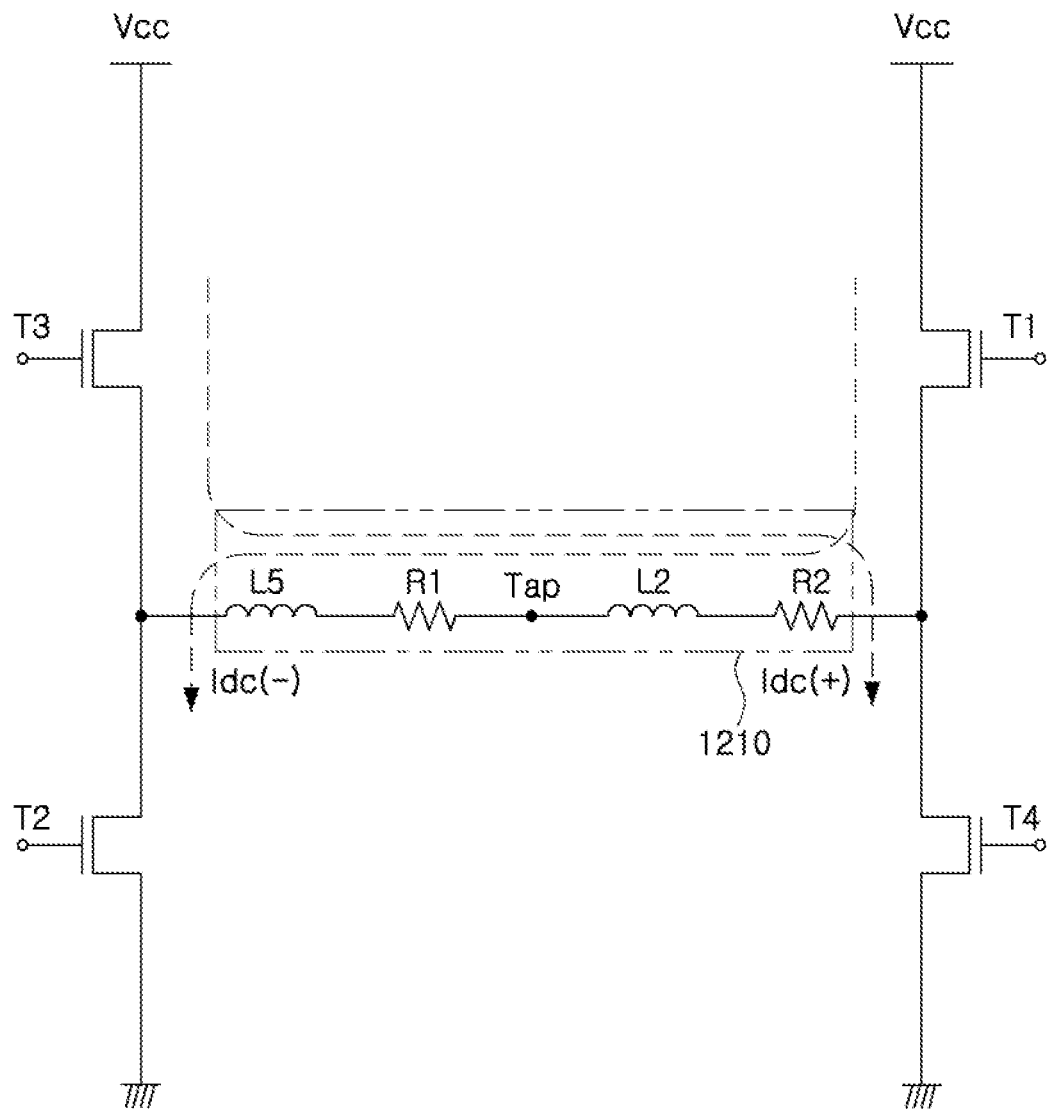
FIG. 9 illustrates an example of an equivalent circuit of the circuit of FIG. 8 for a direct current (DC) signal.

FIG. 9 illustrates an example of an equivalent circuit of the circuit of FIG. 8 for a direct current (DC) signal.

The equivalent circuit of FIG. 9 of the circuit of FIG. 8 for the DC signal is an equivalent circuit of FIG. 8 in a case in which the DC signal is provided as a gate control signal driving the transistors of the driving circuit.

In a case in which a DC signal at a high level is provided to the first transistor T1 and the second transistor T2 as the gate control signal and a DC signal at a low level is provided to the third transistor T3 and the fourth transistor T4 as the gate control signal, the first transistor T1 and the second transistor T2 are turned on to cause the first path current Idc(−) to flow, the third transistor T3 and the fourth transistor T4 are turned off, and an amount of the first path current Idc(−) is determined according to a voltage provided to the gate of the second transistor T2.

In addition, in a case in which a DC signal at a low level is provided to the first transistor T1 and the second transistor T2 as the gate control signal and a DC signal at a high level is provided to the third transistor T3 and the fourth transistor T4 as the gate control signal, the third transistor T3 and the fourth transistor T4 are turned on to cause the second path current Idc(+) to flow, the first transistor T1 and the second transistor T2 are turned off, and an amount of the second path current Idc(+) is determined according to a voltage provided to the gate of the fourth transistor T4.

Since the first capacitor Cgnd and the second capacitor Ct of the position detector in FIG. 8 are equivalent to an open circuit with respect to the DC signal, the first capacitor Cgnd and the second capacitor Ct of the position detector do not influence an operation of the driving circuit unit 1120 with respect to the DC signal, and are therefore are not shown in FIG. 9.

Figure 10:
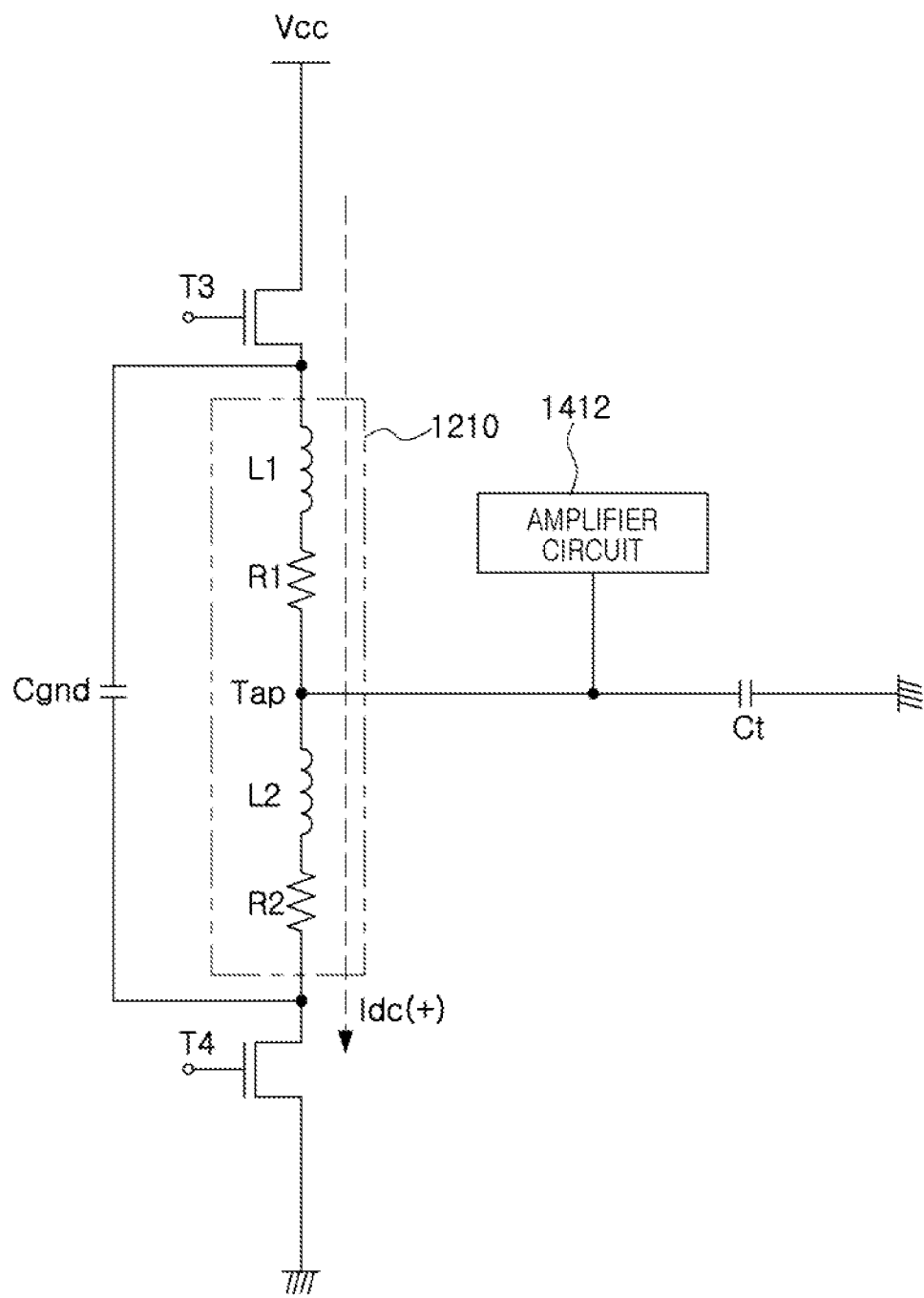
FIGS. 10 through 12 illustrate examples of equivalent circuits of the circuit of FIG. 8 for an alternating current (AC) signal.
Figure 11:
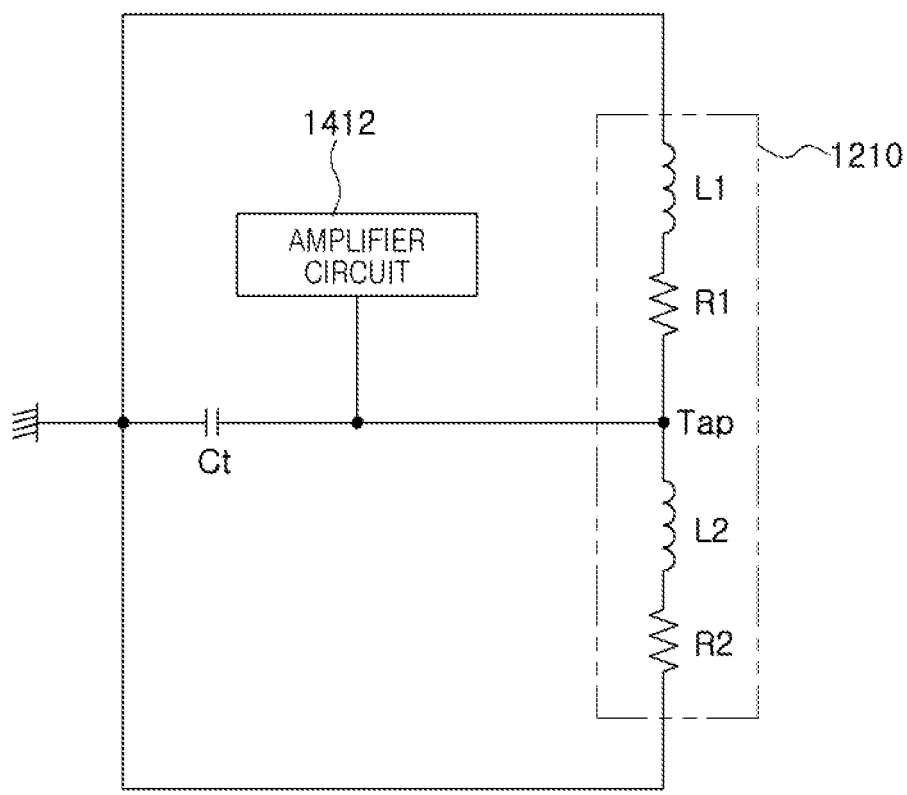
Figure 12:
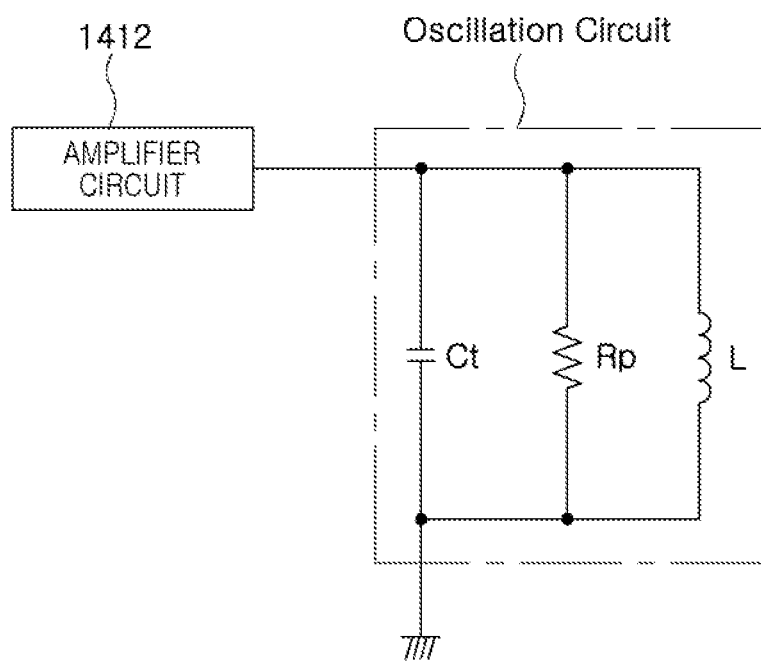

FIGS. 10 through 12 illustrate examples of equivalent circuits of the circuit of FIG. 8 for an alternating current (AC) signal.

An alternating current (AC) signal is an oscillation signal output from an oscillation circuit to be described later. Therefore, the equivalent circuit of the circuit of FIG. 8 for the AC signal is an equivalent circuit of FIG. 8 for the oscillation signal.

In order to describe the equivalent circuit of the circuit of FIG. 8 for the AC signal, when it is assumed that the first transistor T1 and the second transistor T2 are turned off, the circuit of FIG. 8 has an equivalent circuit as illustrated in FIG. 10. In FIG. 10, the third transistor T3 and the fourth transistor T4 are turned on and an amount of the second path current Idc(+) is determined according to a voltage provided to the gate of the fourth transistor T4, so that the second path current Idc(+) flows through the integrated coil 1210.

In this case, since an equivalent resistance of the third transistor T3 is very small when the third transistor T3 is turned on, the third transistor T3 is equivalent to a short circuit, so that both terminals of the third transistor T3 maintain a grounded state for the AC signal. That is, Vcc has a constant value and does not oscillate, so in an AC analysis, Vcc may be considered to be equal to zero. Therefore, both terminals of the third transistor T3 may serve as a ground (AC GND) for the AC signal.

When the second path current Idc(+) is close to zero, the fourth transistor T4 is equivalent to an open circuit. In contrast, when the second path current Idc(+) is close to the maximum current, the fourth transistor T4 is equivalent to a short circuit, so that both terminals of the fourth transistor T4 maintain a grounded state for the AC signal.

The first capacitor Cgnd connected in parallel with the integrated coil 1210 is equivalent to a short circuit for the AC signal. Therefore, the first capacitor Cgnd provides a ground (AC GND) for the AC signal to both ends of the integrated coil 1210. Therefore, the circuit illustrated in FIG. 10 is equivalent to a circuit illustrated in FIG. 11, regardless of the amount of current of the second path current Idc(+).

In FIG. 10, although the first capacitor Cgnd is illustrated as being connected in parallel with the integrated coil 1210, in another example, two first capacitors Cgnd may be provided, with one of the two first capacitors Cgnd being connected between one end of the integrated coil 1210 and the ground, and the other of the two first capacitors Cgnd being connected between the other end of the integrated coil 1210 and the ground.

The first inductor L1 and the second inductor L2 of the integrated coil 1210, which are connected in parallel with each other in relation to the tap terminal Tap of the integrated coil 1210, are equivalent to an inductor L (=(L1\*L2)/(L1+L2)).

The capacitor Ct is represented by Equation 1 below. Referring to Equation 1, the capacitor Ct is represented by a capacitor C1 viewed from the first inductor L1 side, a capacitor C2 viewed from the second inductor L2 side, and a parasitic capacitor Cp.

$$Ct = C1 + C2 + Cp \quad (1)$$

In addition, the first resistor R1 and the second resistor R2, which are connected in parallel with each other in relation to the tap terminal Tap of the integrated coil 1210, are equivalent to a resistor Rp according to the Equation 2 below.

$$Rp1 = \frac{1}{R1}\frac{L1}{C1},$$

$$Rp2 = \frac{1}{R2}\frac{L2}{C2}, \quad (2)$$

$$Rp = Rp1 \,//\, Rp2$$

Therefore, the circuit illustrated in FIG. 11 is equivalent to a circuit illustrated in FIG. 12. In this case, an oscillation frequency of an oscillation circuit including the capacitor Ct, the resistor Rp, and the inductor L is represented by Equation 3 below. Hereinafter, for convenience of explanation, the capacitor Ct, the resistor Rp, and the inductor L, which are connected in parallel with each other, will be referred to as the oscillation circuit.

$$f = \frac{1}{2\pi\sqrt{L*Ct}} \quad (3)$$

Figure 13:
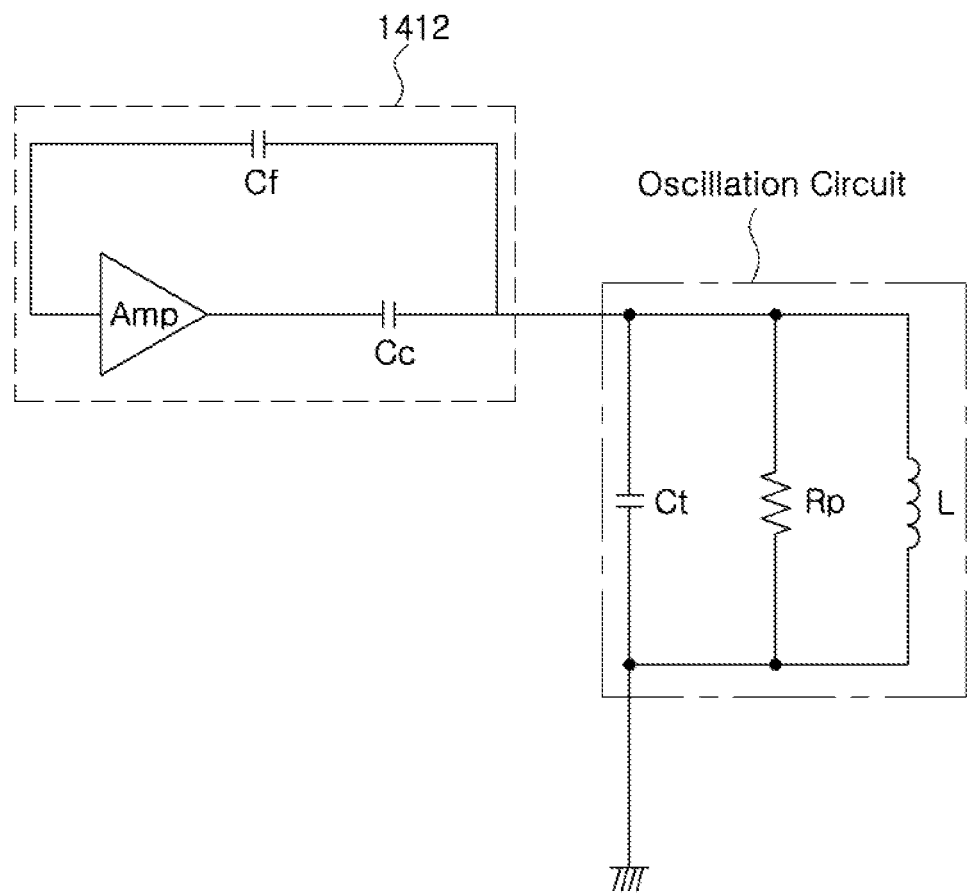
FIG. 13 illustrates an example of an amplifier circuit of FIG. 8.

FIG. 13 illustrates an example of an amplifier circuit of FIG. 8.

An amplifier circuit 1412 includes an amplifier Amp, a capacitor Cf, and a capacitor Cc. A first terminal of the capacitor Cc is connected to an output terminal of the amplifier Amp, and a second terminal of the capacitor Cc is connected to an input of the oscillation circuit including the capacitor Ct, the resistor Rp, and the inductor L. The capacitor Cf is connected between the second terminal of the capacitor Cc and an input terminal of the amplifier Amp.

The amplifier circuit 1412 compensates for a loss of oscillation energy due to the resistor Rp to maintain an oscillation by the inductor L and the capacitor Ct of the oscillation circuit, specifically, an LC oscillation. In this case, a transconductance gain of the amplifier Amp for maintaining the oscillation satisfies Equation 4 below.

$$gm \geq 1/Rp \qquad (4)$$

In a state in which the oscillation is maintained, when a distance between the detection target 1300 and the inductor L changes with the movement of the lens barrel, an inductance of the inductor L changes and the frequency of the oscillation signal output from the oscillation circuit changes. In this case, the oscillation of the oscillation circuit occurs at the tap terminal Tap of the integrated coil 1210 even if a current in either direction of the first path current Idc(−) and the second path current Idc(+) flows.

Therefore, the position detector 1400 is able to calculate the position of the lens barrel according to the change in the frequency of the oscillation signal with the change in the inductance of the integrated coil even in any period in which a control signal is applied to the plurality of transistors of the driving circuit 1120.

The oscillation signal Sosc1 output from the oscillation circuit is input to the amplifier Amp through the capacitor Cf, and the amplifier Amp amplifies the input oscillation signal and outputs the amplified oscillation signal through the capacitor Cs so that the oscillation of the oscillation circuit is maintained. The amplified oscillation signal Sosc1 is input to the frequency detector 1430 in FIG. 5.

An example of the operation of generating the oscillation signal from the integrated coil has been described above with reference to FIGS. 6 through 13. However, the oscillation signal may be generated from the integrated coil in other ways, for example, as described in the examples disclosed in U.S. patent application Ser. No. 16/035,968 filed on Jul. 16, 2018, which claims the benefit of Korean Patent Application No. 10-2017-0156703 filed on Nov. 22, 2017. The entire disclosures of U.S. patent application Ser. No. 16/035,968 and Korean Patent Application No. 10-2017-0156703 are incorporated herein by reference.

Figure 14:
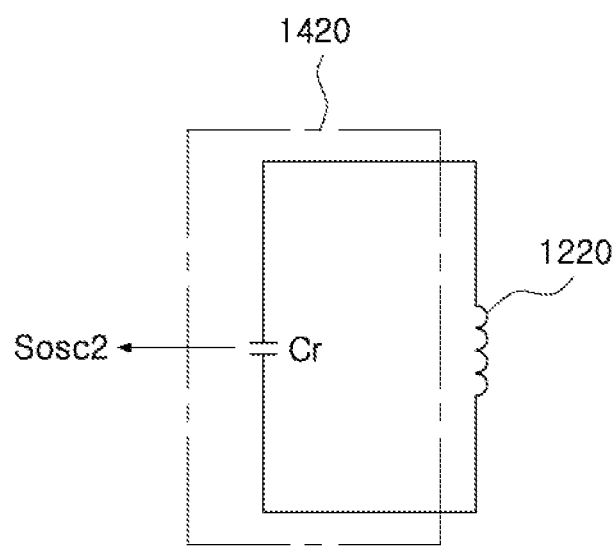
FIG. 14 is a view for describing an example of an operation of generating an oscillation signal from a sensing coil.

FIG. 14 is a view for describing an example of an operation of generating an oscillation signal from a sensing coil.

Referring to FIG. 14, a second oscillator 1420 includes the sensing coil 1220 and a capacitor Cr forming an LC oscillator. A frequency of a second oscillation signal Sosc2 output from the second oscillator 1420 is determined according to an inductance of the sensing coil 1220 and a capacitance of the capacitor Cr.

In a case in which the detection target 1300 moves together with the lens barrel, an intensity of a magnetic field of the detection target 1300 that affects the inductance of the sensing coil 1220 changes, so the inductance of the sensing coil 1220 changes. Therefore, the frequency of the second oscillation signal Sosc2 changes depending on the movement of the detection target 1300.

Referring to again FIG. 5, the frequency detector 1430 detects frequencies of the first oscillation signal Sosc1 and the second oscillation signal Sosc2.

The frequency detector 1430 detects the frequencies of the first oscillation signal Sosc1 and the second oscillation signal Sosc2 output from the first oscillator 1410 and the second oscillator 1420. As an example, the frequency detector 1430 detects the frequencies of the first oscillation signal Sosc1 and the second oscillation signal Sosc2 using a reference clock CLK. Specifically, the calculator 1430 counts a number of periods of the reference clock CLK in one period of the first oscillation signal Sosc1 and a number of periods of the reference clock CLK in one period of the second oscillation signal Sosc2. The reference clock CLK is a clock signal having an extremely high frequency. As an example, in a case in which the first oscillation signal Sosc1 and the second oscillation signal Sosc2 of one period are counted by the reference clock CLK during a reference period, count values of the reference clock CLK corresponding to the first oscillation signal Sosc1 and the second oscillation signal Sosc2 of one period are calculated. The frequency detector 1430 detects the frequencies of the first oscillation signal Sosc1 and the second oscillation signal Sosc2 based on the count values of the reference clock CLK and the frequency of the reference clock CLK.

The frequency-to-position converter 1440 receives the frequencies of the first oscillation signal Sosc1 and the second oscillation signal Sosc2 from the frequency detector 1430, and determines the position of the detection target 1300 depending on the frequencies of the first oscillation signal Sosc1 and the second oscillation signal Sosc2. The frequency-to-position converter 1440 includes a memory, and position information of the detection target 1300 and corresponding frequencies of the first oscillation signal Sosc1 and the second oscillation signal Sosc2 are stored in the memory. The memory is a non-volatile memory, such as a flash memory, an electrically erasable programmable read-only memory (EEPROM), or a ferroelectric random access memory (FeRAM).

As described above, the widths of the integrated coil 1210 and the sensing coil 1220 in the direction perpendicular to the optical axis direction increase or decrease in opposite directions along one direction of the optical axis. Therefore, in a case in which the detection target moves along one direction of the optical axis, the inductances of the integrated coil 1210 and the sensing coil 1220 increase or decrease in opposite directions. For example, the inductance of the integrated coil 1210 increases and the inductance of the sensing coil 1220 decreases as the detection target moves along one direction of the optical axis, or the inductance of the integrated coil 1210 decreases and the inductance of the sensing coil 1220 increases as the detection target moves along the one direction of the optical axis. Therefore, the frequencies of the first oscillation signal Sosc1 and the second oscillation signal Sosc2 also increase or decrease in opposite directions as the detection target moves along the one direction of the optical axis.

However, a change in an external factor such as a temperature or other factor will cause the frequencies of the first oscillation signal Sosc1 and the second oscillation signal Sosc2 to increase or decrease in the same direction. In this case, the changes in the frequencies of the first oscillation signal Sosc1 and the second oscillation signal Sosc2 do not correspond to a movement of the detection target along the one direction of the optical axis.

Accordingly, the frequency-to-position converter 1440 decides whether change directions (increase or decrease directions) of the frequencies of the first oscillation signal Sosc1 and the second oscillation signal Sosc2 are different from each other, or are the same as each other.

When the frequency-to-position converter 1440 decides that change directions (increase or decrease directions) of the frequencies of the first oscillation signal Sosc1 and the second oscillation signal Sosc2 are different from each other, the frequency-to-position converter 1440 determines the position of the detection target 1300 based on a difference between the frequency of the first oscillation signal Sosc1 and the frequency of the second oscillation signal Sosc2. The common noise component introduced into the camera module is removed by determining the position of the detection target 1300 based on the difference between the frequency of the first oscillation signal Sosc1 and the frequency of the second oscillation signal Sosc2.

However, when the frequency-to-position converter 1440 decides that change directions (increase or decrease directions) of the frequencies of the first oscillation signal Sosc1 and the second oscillation signal Sosc2 are the same as each other, the frequency-to-position converter 1440 determines that the frequencies of the first oscillation signal Sosc1 and the second oscillation signal Sosc2 have changed according to a change in an external factor such as a temperature or other factor. Therefore, the frequency-to-position converter 1440 determines an accurate position of the detection target 1300 by ignoring the changes in the frequencies of the first oscillation signal Sosc1 and the second oscillation signal Sosc2 due to the external factor from a process of detecting a position of the detection target 1300.

Figure 15:
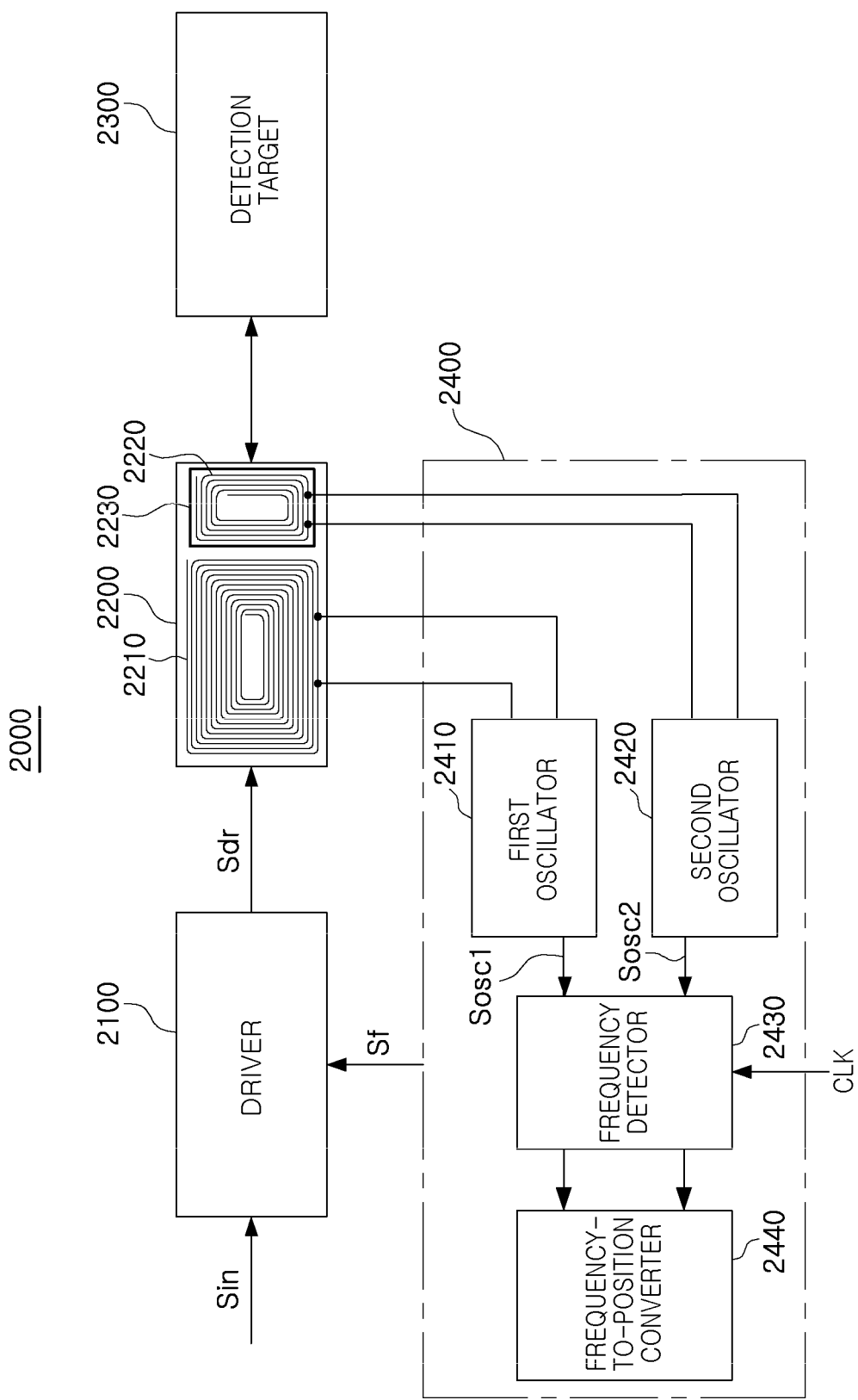
FIG. 15 is a block diagram of an example of a shake correction unit.

FIG. 15 is a block diagram of an example of a shake correction unit.

A shake correction unit of FIG. 15 operates as an actuator that drives the lens barrel in a direction perpendicular to the optical axis. Hereinafter, the shake correction unit is referred to as an actuator for convenience of explanation.

An actuator 2000 of FIG. 15 drives the lens barrel in a direction perpendicular to the optical axis to perform an optical image stabilization (OIS) function of the camera module. Therefore, when the actuator 2000 of FIG. 15 performs the optical image stabilization function, a driver 2100 applies a driving signal to an integrated coil 2210 to provide a driving force in the direction perpendicular to the optical axis to the lens barrel.

The actuator 2000 includes the driver 2100, an OIS coil unit 2200 including the integrated coil 2210, a reference coil 2220, and a shielding layer 2230, a detection target 2300, and a position detector 2400. The position detector 2400 includes a first oscillator 2410, a second oscillator 2420, a frequency detector 2430, and a frequency-to-position converter 2440. As an example, the detection target 2300 corresponds to one of the magnets 510a and 520b of FIG. 2 disposed to face the integrated coil 2210. In another example, the detection target 2300 is provided as a separate element.

Since the actuator 2000 illustrated in FIG. 15 is similar to the actuator 1000 illustrated in FIG. 5, a description of similar features will be omitted, and only features that are different will be described.

The OIS coil unit 2200 includes the integrated coil 2210, the reference coil 2220, and the shielding layer 2230. The shielding layer 2230 is disposed between the reference coil 2220 and the detection target 2300 to prevent an inductance of the reference coil 2220 from changing with a movement of the detection target 2300.

Therefore, a frequency of a first oscillation signal Sosc1 generated from the integrated coil 2210 changes with the movement of the detection target 2300, and a frequency of a second oscillation signal Sosc2 generated from the reference coil 2220 remains constant even in a case in which the detection target 2300 moves. However, the frequencies of the first oscillation signal Sosc1 and the second oscillation signal Sosc2 may change according to a common noise component introduced into the camera module.

Therefore, the frequency-to-position converter 2440 removes the common noise component calculating a difference between the frequencies of the first oscillation signal Sosc1 and the second oscillation signal Sosc2, and determining the position of the detection target 2300 based on the calculated difference. The frequency-to-position converter 2440 includes a memory, and position information of the detection target 2300 and corresponding differences between the frequency of the first oscillation signal Sosc1 and the second oscillation signal Sosc2 are stored in the memory.

Figure 16:
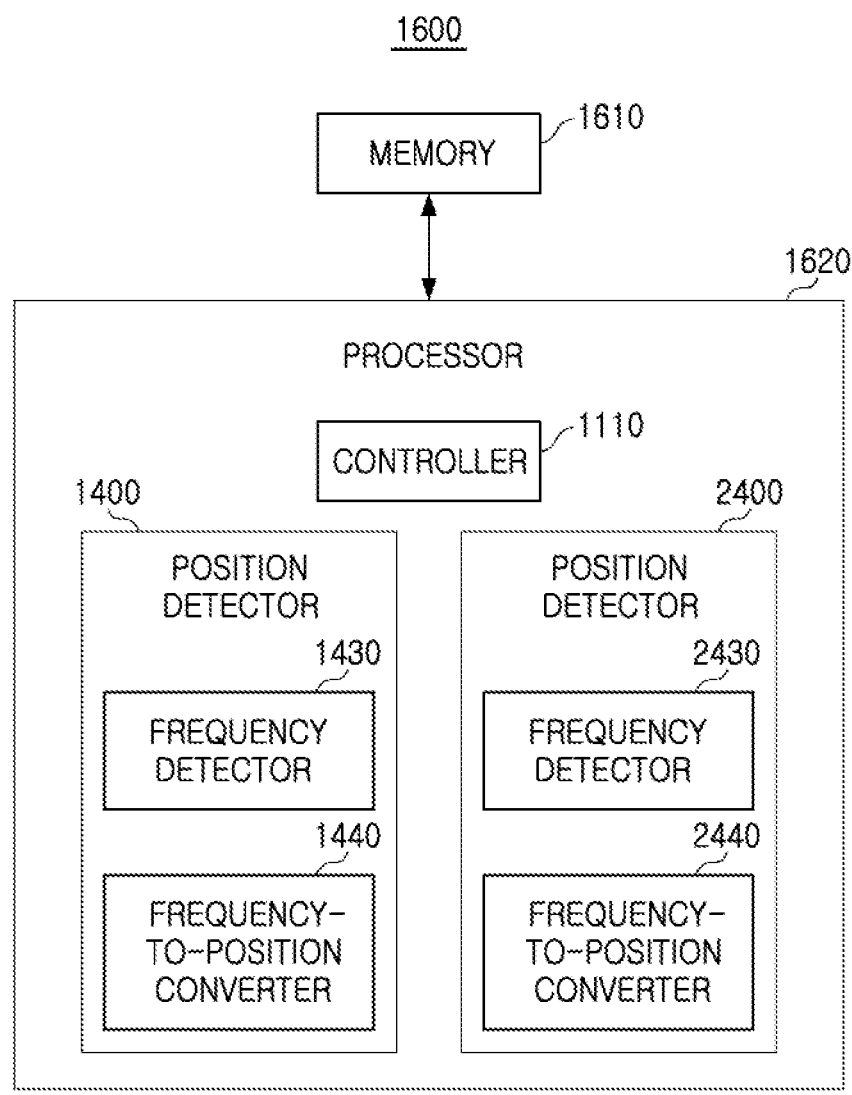
FIG. 16 is a block diagram of an example of an actuator controller of the actuators of FIGS. 5 and 15.

FIG. 16 is a block diagram of an example of an actuator controller of the actuators of FIGS. 5 and 15.

Referring to FIG. 16, an actuator controller 1600 includes a memory 1610 and a processor 1620. The memory 1610 stores instructions that, when executed by the processor 1620, cause the processor 1620 to perform the functions of the controller 1110 in FIGS. 6 and 7, the position detector 1400 in FIGS. 5 and 6, the frequency detector 1430 and the frequency-to-position converter 1440 in FIG. 5, and the position detector 2400, the frequency detector 2430, and the frequency-to-position converter 2440 in FIG. 15. Thus, the processor 1620 includes the controller 1110, the position detector 1400, the frequency detector 1430, the frequency-to-position converter 1440, the position detector 2400, the frequency detector 2430, and the frequency-to-position converter 2440. In one example, the processor 1620 also includes two controllers 2110 that are the same as the controller 1110, and two of each of the position detector 2400, the frequency detector 2430, and the frequency-to-position converter 2440.

The controller 1110 is part of the driver 1100 in FIG. 5 that controls the driving signal Sdr applied to the integrated coil 1210 in FIG. 5 to move the lens barrel in the optical axis (Z axis) direction. The position detector 1400 is the position detector 1400 in FIG. 5 that detects the position of the lens barrel in the optical axis (Z axis) direction.

A first one of the two controllers 2110 is part of a first one of the driver 2100 in FIG. 15 that controls the driving signal Sdr applied to a first one of the integrated coil 2210 in FIG. 15 to move the lens barrel in a first axis (X axis) direction perpendicular to the optical axis (Z axis). A first one of the two position detectors 2400 is a first one of the position detector 2400 in FIG. 15 that detects the position of the lens barrel in the first axis (X axis) direction.

A second one of the two controllers 2110 is part of a second one of the driver 2100 in FIG. 15 that controls the driving signal Sdr applied to a second one of the integrated coil 2210 in FIG. 15 to move the lens barrel in a second axis (Y axis) direction perpendicular to the optical axis (Z axis) and the first axis (X axis). A second one of the two position detectors 2400 is a second one of the position detector 2400 in FIG. 15 that detects the position of the lens barrel in the second axis (Y axis) direction.

The actuator of a camera module in the examples described above precisely detects the position of the detection target 1300 based on the change in the frequency of the oscillation signal Sosc caused by the change in the inductance of the driving coil 1200 as the detection target 1300 moves. Further, the actuator of a camera module does not use a separate Hall sensor, such that a manufacturing cost of the actuator of a camera module may be reduced and a space efficiency of the actuator of a camera module may be improved.

In the examples described above, since the camera module does not use a separate Hall sensor to detect a position of the lens barrel, a manufacturing cost of the camera module may be reduced and a space efficiency of the camera module may be improved.

The driver 1100, the position detector 1400, the frequency detector 1430, and the frequency-to-position converter 1440 in FIG. 5, the driver 1100, the controller 1110, and the position detector 1400 in FIG. 6, the driver 1100 and the controller 1110 in FIG. 7, the driver 2100, the position detector 2400, the frequency detector 2430, and the frequency-to-position converter 2440 in FIG. 15, and the actuator controller 1600, the memory 1610, the processor 1620, the controller 1110, the position detector 1400, the frequency detector 1430, the frequency-to-position converter 1440, the position detector 2400, the frequency detector 2430, and the frequency-to-position converter 2440 in FIG. 16 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, transistors, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods described with reference to FIGS. 1-16 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module comprising:
a lens barrel configured to be movable;
a detection target disposed on one side of the lens barrel;
an integrated coil and a sensing coil facing the detection target and disposed in a direction perpendicular to a direction of movement of the lens barrel;
a driver configured to apply a driving signal to the integrated coil; and
a position detector configured to detect a position of the lens barrel according to an inductance of the integrated coil and an inductance of the sensing coil,
wherein a width of the integrated coil in the direction perpendicular to the direction of movement of the lens barrel and a width of the sensing coil in the direction perpendicular to the direction of movement of the lens barrel change in the direction of movement of the lens barrel.

2. The camera module of claim 1, wherein the width of the integrated coil in the direction perpendicular to the direction of movement of the lens barrel and the width of the sensing coil in the direction perpendicular to the direction of movement of the lens barrel increase or decrease in opposite directions in the direction of movement of the lens barrel.

3. The camera module of claim 1, wherein the width of the integrated coil in the direction perpendicular to the direction of movement of the lens barrel is greater than the width of the sensing coil in the direction perpendicular to the direction of movement of the lens barrel.

4. The camera module of claim 1, wherein the position detector is further configured to compare the inductance of the integrated coil and the inductance of the sensing coil with each other, and detect the position of the lens barrel based on a result of the comparing of the inductances with each other.

5. The camera module of claim 4, wherein the position detector is further configured to compare directions in which the inductance of the integrated coil and the inductance of the sensing coil increase or decrease with each other, and detect the position of the lens barrel based on a result of the comparing of the directions with each other.

6. The camera module of claim 5, wherein the position detector is further configured to detect the position of the lens barrel based on a difference between the inductance of the integrated coil and the inductance of the sensing coil in response to the result of the comparing of the directions with each other indicating that the inductance of the integrated coil and the inductance of the sensing coil increase or decrease in opposite directions.

7. The camera module of claim 5, wherein the position detector is further configured not to detect the position of the lens barrel in response to the result of the comparing of the directions with each other indicating that the inductance of the integrated coil and the inductance of the sensing coil increase or decrease in a same direction.

8. The camera module of claim 1, wherein the position detector is further configured to generate a first oscillation signal according to the inductance of the integrated coil and a second oscillation signal according to the inductance of the sensing coil, and detect the position of the lens barrel according to a frequency of the first oscillation signal and a frequency of the second oscillation signal.

9. A camera module comprising:
a lens barrel configured to be movable;
a detection target configured to be movable with the lens barrel;
an integrated coil facing the detection target;
a reference coil facing the detection target;
a shielding layer disposed between the reference coil and the detection target;
a driver configured to apply a driving signal to the integrated coil; and
a position detector configured to detect a position of the lens barrel according to an inductance of the integrated coil and an inductance of the reference coil.

10. The camera module of claim 9, wherein the integrated coil is disposed on a first surface of the shielding layer, and the reference coil is disposed on a second surface of the shielding layer.

11. The camera module of claim 9, wherein the integrated coil comprises a plurality of layers,
the shielding layer is disposed facing the detection target in a hollow portion of at least one layer of the plurality of layers, and
the reference coil is disposed in a hollow portion of at least one other layer of the plurality of layers.

12. The camera module of claim 9, wherein the inductance of the integrated coil changes according to a movement of the lens barrel, and
the inductance of the reference coil is remains substantially constant as the lens barrel moves.

13. The camera module of claim 9, wherein the inductance of the integrated coil and the inductance of the reference coil change according to a common noise component.

14. The camera module of claim 13, wherein the position detector is further configured to remove the common noise component by detecting the position of the detection target based on a difference between the inductance of the integrated coil and the inductance of the reference coil.

15. The camera module of claim 9, wherein the position detector is further configured to detect the position of the detection target based on a difference between the inductance of the integrated coil and the inductance of the reference coil.

16. The camera module of claim 9, wherein the inductance of the integrated coil is greater than the inductance of the reference coil.

17. The camera module of claim 9, wherein the integrated coil is disposed at a fixed position relative to the reference coil.

18. The camera module of claim 9, wherein the reference coil faces the shielding layer in a first direction, and
the integrated coil and the reference coil either face the detection target in the first direction, or are disposed next to each other in a second direction perpendicular to the first direction.

19. A camera module comprising:
a lens barrel configured to be movable;
a detection target disposed on the lens barrel;
an integrated coil and a sensing coil disposed facing the detection target in a direction perpendicular to a direction of an optical axis of the lens barrel;
a driver configured to apply a driving signal to the integrated coil to drive the lens barrel in the optical axis direction; and
a position detector configured to detect a position of the lens barrel in the optical axis direction according to an inductance of the integrated coil and an inductance of the sensing coil,
wherein a geometry of the integrated coil causes the inductance of the integrated coil to change in a first direction as the lens barrel moves in the optical axis direction, and
a geometry of the sensing coil causes the inductance of the sensing coil to change in a second direction opposite to the first direction as the lens barrel moves in the optical axis direction.

20. The camera module of claim 19, wherein the geometry of the integrated coil and the geometry of the sensing coil cause the inductance of the integrated coil to increase and the inductance of the sensing coil to decrease as the lens barrel moves in a first direction in the optical axis direction, and cause the inductance of the integrated coil to decrease and the inductance of the sensing coil to increase as the lens barrel moves in a second direction in the optical axis direction opposite to the first direction.

21. The camera module of claim 19, wherein the position detector is further configured to detect the position of the lens barrel in the optical axis direction based on a difference between the inductance of the integrated coil and the inductance of the sensing coil.

22. The camera module of claim 19, wherein a common noise component causes the inductance of the integrated coil and the inductance of the sensing coil to change in a same direction, and
the position detector is further configured to remove the common noise component by detecting the position of the lens barrel in the optical axis direction based on a difference between the inductance of the integrated coil and the inductance of the sensing coil.

23. A camera module comprising:
a lens barrel configured to be movable;
a detection target disposed on the lens barrel;
an integrated coil and a reference coil disposed facing the detection target in a direction perpendicular to a direction of an optical axis of the lens barrel;
a driver configured to apply a driving signal to the integrated coil to drive the lens barrel in the direction perpendicular to the optical axis direction; and
a position detector configured to detect a position of the lens barrel in the direction perpendicular to the optical axis direction according to an inductance of the integrated coil and an inductance of the reference coil,
wherein the inductance of the integrated coil changes as the lens barrel moves in the direction perpendicular to the optical axis direction, and
the inductance of the reference coil remains substantially constant as the lens barrel moves in the direction perpendicular to the optical axis direction.

24. The camera module of claim 23, further comprising a shielding layer disposed between the reference coil and the detection target so that the reference coil faces the detection target through the shielding layer,
wherein the shielding layer prevents the inductance of the reference coil from substantially changing as the lens barrel moves in the direction perpendicular to the optical axis direction.

25. The camera module of claim 23, wherein the position detector is further configured to detect the position of the lens barrel in the direction perpendicular to the optical axis direction based on a difference between inductance of the integrated coil and the inductance of the reference coil.

26. The camera module of claim 23, wherein a common noise component causes the inductance of the integrated coil and the inductance of the reference coil to change in a same direction, and
the position detector is further configured to remove the common noise component by detecting the position of the lens barrel in the direction perpendicular to the optical axis direction based on a difference between the inductance of the integrated coil and the inductance of the reference coil.

\* \* \* \* \*